(12) United States Patent
Ali et al.

(10) Patent No.: US 12,052,602 B2
(45) Date of Patent: Jul. 30, 2024

(54) SIDELINK ADMISSION CONTROL MECHANISMS FOR NEW RADIO SYSTEMS

(71) Applicant: Apple Inc., Cupertino, CA (US)

(72) Inventors: Ansab Ali, Hillsboro, OR (US); Kyeongin Jeong, Portland, OR (US); Sangeetha L. Bangolae, Houston, TX (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 17/431,211

(22) PCT Filed: Mar. 26, 2020

(86) PCT No.: PCT/US2020/024827
§ 371 (c)(1),
(2) Date: Aug. 16, 2021

(87) PCT Pub. No.: WO2020/198415
PCT Pub. Date: Oct. 1, 2020

(65) Prior Publication Data
US 2022/0141702 A1    May 5, 2022

Related U.S. Application Data

(60) Provisional application No. 62/824,726, filed on Mar. 27, 2019.

(51) Int. Cl.
*H04W 28/02* (2009.01)
*H04W 4/40* (2018.01)
*H04W 92/18* (2009.01)

(52) U.S. Cl.
CPC ......... *H04W 28/0257* (2013.01); *H04W 4/40* (2018.02); *H04W 28/0268* (2013.01); *H04W 92/18* (2013.01)

(58) Field of Classification Search
None
See application file for complete search history.

(56) References Cited

U.S. PATENT DOCUMENTS

10,757,030 B2   8/2020   Loehr et al.
10,779,189 B2   9/2020   Khoryaev et al.
(Continued)

FOREIGN PATENT DOCUMENTS

| CN | 107925906 A | 4/2018 |
| CN | 109314841 A | 2/2019 |
| EP | 3273634 A | 1/2018 |

OTHER PUBLICATIONS

International Preliminary Report on Patentability dated Sep. 28, 2021 in connection with PCT Application No. PCT/US2020/024827.

(Continued)

*Primary Examiner* — Diane L Lo
(74) *Attorney, Agent, or Firm* — Eschweiler & Potashnik, LLC

(57) ABSTRACT

A service device (e.g., a user equipment (UE), or other network component) can operate to generate sidelink communications with peer UE vehicle-to-vehicle devices based on PC5 channel to enable a peer-to-peer communication as part of PC5 vehicle-to-everything (V2X) communications. An admission control scheme or a congestion control scheme can be enabled by determining a configured mapping based on various criteria, including a priority of V2X services, V2X packet Quality of Service (QoS) indications per packet, or other criteria. A UE can determine whether a packet is authorized via the sidelink channel based on the configured mapping.

14 Claims, 7 Drawing Sheets

(56) References Cited

U.S. PATENT DOCUMENTS

| | | |
|---|---|---|
| 2018/0234973 A1 | 8/2018 | Lee et al. |
| 2019/0124015 A1* | 4/2019 | Loehr .................. H04L 5/0058 |
| 2020/0163005 A1* | 5/2020 | Rao ........................ H04W 4/46 |
| 2021/0153065 A1* | 5/2021 | Adjakple .............. H04W 76/14 |
| 2021/0345363 A1* | 11/2021 | Zhang ................. H04W 72/543 |
| 2022/0132603 A1* | 4/2022 | Adjakple ............. H04W 8/005 |

OTHER PUBLICATIONS

PCT Search Report dated Jun. 9, 2020 in connection with PCT Application No. PCT/US2020/024827.
PCT Written Opinion dated Jun. 9, 2020 in connection with PCT Application No. PCT/US2020/024827.

* cited by examiner

UNICAST

GROUPCAST

BROADCAST

SIDELINK ADMISSION CONTROL MECHANISMS FOR NEW RADIO SYSTEMS

REFERENCE TO RELATED APPLICATIONS

This application is a National Phase entry application of International Patent Application No. PCT/US2020/024827 filed Mar. 26, 2020, which claims priority to U.S. Provisional Application No. 62/824,726 filed Mar. 27, 2019, entitled "SIDELINK ADMISSION CONTROL MECHANISMS FOR NEW RADIOS SYSTEMS", the contents of which are herein incorporated by reference in their entirety.

FIELD

The present disclosure relates to wireless technology and more specifically to New Radio (NR) sidelink admission control mechanisms for vehicle-to-everything (V2X) or similar devices.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Some services have ultra-low latency, high data capacity, and strict reliability requirements, as any faults or performance issues in the networks can cause service failure which can result in property damage and body injury. A type of mobile communication includes vehicle communication, where vehicles communicate or exchange vehicle related information. The vehicle communication can include vehicle to everything (V2X), which can include vehicle to vehicle (V2V), vehicle to infrastructure (V2I), and vehicle to pedestrian (V2P), or the like, in which each can include a user equipment (UE) or base station device such as a new radio NodeB (gNB), an eNodeB (eNB), or other device/node. A V2X node, for example, can comprises a new radio NodeB (gNB), an eNodeB (eNB), a user equipment (UE), a Roadside Unit (RSU), a drone, or other vehicle device, or network device when referred to herein. In some situations, vehicle related information is intended for a single vehicle or other entity. In other situations, such as emergency alerts, vehicle related information is intended for a large number of vehicles or other device entities. The emergency alerts can include collision warnings, control loss warnings, collision avoidance, pedestrian safety and other coordination to ensure safe and efficient traffic flows, especially in vehicle (e.g., auto, craft, drone, etc.) to vehicle communications. With the advent of NR V2X use cases, which are expected to be supported both in coverage and out of coverage, there is a need to consider methods for defining efficient mechanisms for providing congestion control among different UEs operating over sidelink performing V2X transmission.

DETAILED DESCRIPTION

Figure 1A:
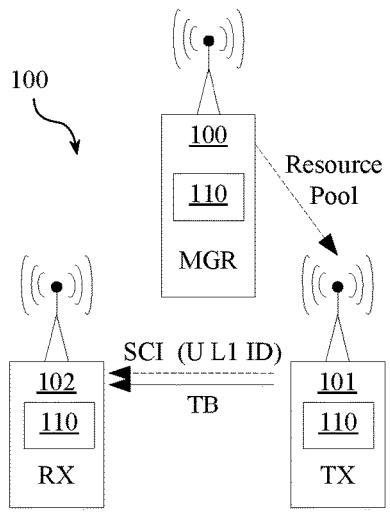
FIG. 1 is a block diagram illustrating an example of user equipment(s) (UEs) communicatively coupled a network with network components as peer devices useable in connection with various embodiments (aspects) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for PC5 vehicle-to-everything UE communication with various admission and congestion control schemes among UEs via a PC5 sidelink. A UE can establish, configure, or set up the PC5 link for the PC5 V2X communication as a sidelink communication by autonomously determining authorization for providing a packet on the PC5 link based on a configured mapping. The vehicle UE can base the admission control on whether the packet is authorized according to a comparison with the configured mapping and various criteria. The criteria can include a QoS of the packet, a channel load status (e.g., a channel busy ratio (CBR)), a V2X service, a sidelink frequency, a PC5 Quality Indicator (PQI), one or more Quality of Service (QoS) criteria, a transmit parameter, a channel load status, or a priority level of the V2X service, for example. Processing circuitry can be further configured to determine whether the packet is authorized to be transmitted over the sidelink channel via an Access Stratum (AS) layer based on a priority of a V2X service of the V2X communication. The V2X service(s) can comprise a platooning operation (e.g., a method of driving in a fleet or flock of vehicles together), an autonomous driving, a sensor sharing, or an intelligent transportation service (ITS). Additional aspects and details of the disclosure are further described below with reference to figures.

Figure 1B:
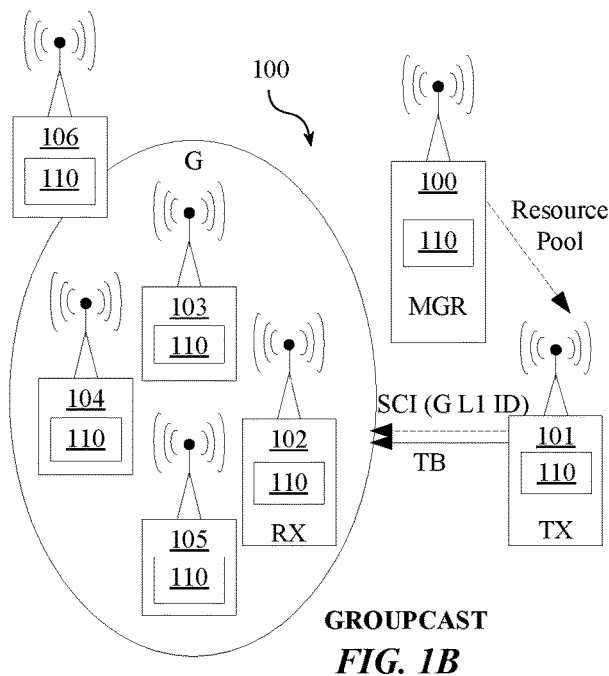
Figure 1C:
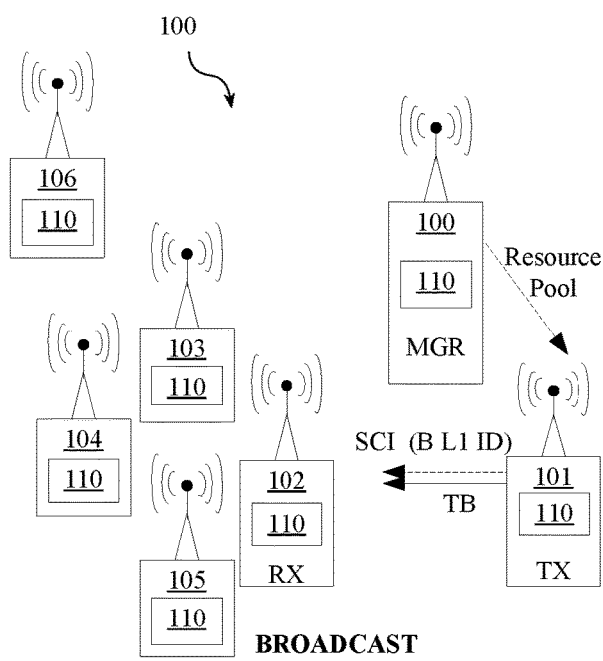

FIGS. 1A-1C are block diagrams of a wireless communication network 100 in which wireless communication devices (e.g., user equipment (UE) devices) can use unicast, groupcast, and broadcast communication in accordance with one or more embodiments herein, for example. Each device in the network includes vehicle-to-everything (V2X) circuitry 110 that includes memory storage and processing circuitry/components including one or more processors configured to perform various types of V2X communication. For the purposes of this description, when a "device" is described as performing some function, it can be understood that it is the processor(s)/component in the V2X device circuitry that is performing the function.

A transmitting (TX) device (e.g., Tx-UE or device 101) seeking to transmit data to one or more receiving (RX) device(s) in the wireless communication network first determines sidelink channel resources that are available for this purpose. In Mode 1 (not shown), the TX device 101 requests sidelink channel resources from a manager device 100 that coordinates communication between the devices in the network. The manager device 100 can be another UE device or a base station device (gNB, eNB, and so on). The manager device 100 provides downlink (DL) control information (DCI) or sidelink configured grant configurations to the TX device that identifies specific sidelink channel resources to be used by the TX device to transmit data. The specific sidelink channel resources are selected from a resource pool allocated to the network.

Depending on whether the TX device is going to perform a unicast, groupcast, or broadcast transmission of data, the TX device determines (e.g., via higher layer signaling) a Layer-1 destination identifier (L1 destination ID) that uniquely identifies one or more channels between the TX device 101 and a specific RX device (a unicast identifier), a group of RX devices (a groupcast identifier), or all RX devices or Rx-UEs (a broadcast identifier) in the wireless communication network. In one example, the channels identified by L1 destination IDs are physical sidelink control channels (PSCCH).

In Mode 2 (shown in FIGS. 1A-1C), the TX device 101 selects sidelink channel resources for transmitting data from a pre-allocated resource pool received a priori from a manager device or network component rather than receiving a designation or allocation of particular sidelink communication resources from the manager device 100.

In the unicast example of FIG. 1A, TX device 101 can be configured transmit data to RX device 102 and no other device. To enable this "direct" communication, the TX device 101 can utilize a unicast L1 destination ID for the device 102 to initiate communication with the RX device 102. TX device 101 sends sidelink control information (SCI) using PSCCH resources associated with the L1 destination ID for RX device 102. The SCI instructs the RX device 102 how to subsequently receive a transport block (TB) of data from TX device 101. For example, the SCI includes the unicast L1 destination ID for the RX device 102 and identifies frequency and time resources that specify a physical sidelink shared channel (PSSCH) that will be used to transmit (and retransmit in certain circumstances) the TB. The SCI can also instruct the RX device whether to provide feedback, such as an ACK/NACK indication, to confirm receipt of the TB or to communicate that the TB was not received. To this end, the SCI can include a hybrid automatic repeat request (HARQ) process identifier that uniquely identifies the TB for use by the RX device in providing feedback.

In the groupcast example of FIG. 1B, TX device 101 seeks to transmit data to a group G that includes several devices 102, 103, 104, 105 (while only four devices are in the illustrated group, a different number can be in a group). A Groupcast LI destination ID identifies PSCCH channel(s) monitored by devices in group G for SCI. To enable the groupcast communication, the TX device 101 determines the LI destination ID for the group G. TX device 101 sends SCI using the PSCCH resources associated with the LI destination ID for group G. The SCI instructs devices in group G how to subsequently receive a TB from device 101. For example, the SCI includes the groupcast L1 destination ID for the group G and identifies frequency and time resources that specify a physical sidelink shared channel (PSSCH) that will be used to transmit and retransmit (in certain circumstances) the TB.

The SCI can indicate a groupcast option 1 or 2 that instruct the RX devices in the group G whether and how to provide feedback. In groupcast option 1, when feedback is enabled the only type of feedback provided by the RX device is NACK, and in some examples, when a particular RX device is outside a communication range specified in the SCI the RX device does not provide any feedback. In groupcast option 2, when feedback is enabled, both ACK/NACK feedback are provided the by the RX device. The SCI can include a hybrid automatic repeat request (HARQ) process identifier that uniquely identifies the TB for use by the RX device in providing feedback.

In the broadcast example of FIG. 1C, TX device 101 seeks to transmit data to all devices in the network. A Broadcast L1 destination ID identifies PSCCH channel(s) monitored by all devices in the network for SCI. To enable the broadcast communication, the device 101 determines the broadcast L1 destination ID for the network. TX Device 101 sends SCI using the PSCCH resources associated with the broadcast LI destination ID for the network. The SCI instructs devices the network how to subsequently receive data from device 101. For example, the SCI includes the broadcast L1 destination ID and identifies frequency and time resources that specify a physical sidelink shared channel (PSSCH) that will be used to transmit and retransmit (in certain circumstances) the TB.

Two modes of operation for V2X communication can be configured, namely over the PC5 and over LTE-Uu. LTE-Uu can be unicast or multimedia broadcast services (MBMS). These two operation modes can be used by a UE independently for transmission and reception (e.g. a UE can use MBMS for reception without using LTE-Uu for transmission). A UE can also receive V2X messages via LTE-Uu unicast downlink. For both operation modes, V2X devices (e.g. in different domains) can communicate with each other for the exchange of V2X messages. The interface between V2X application servers and the methods of the exchange of messages between V2X application servers is out of scope of 3GPP.

Figure 2:
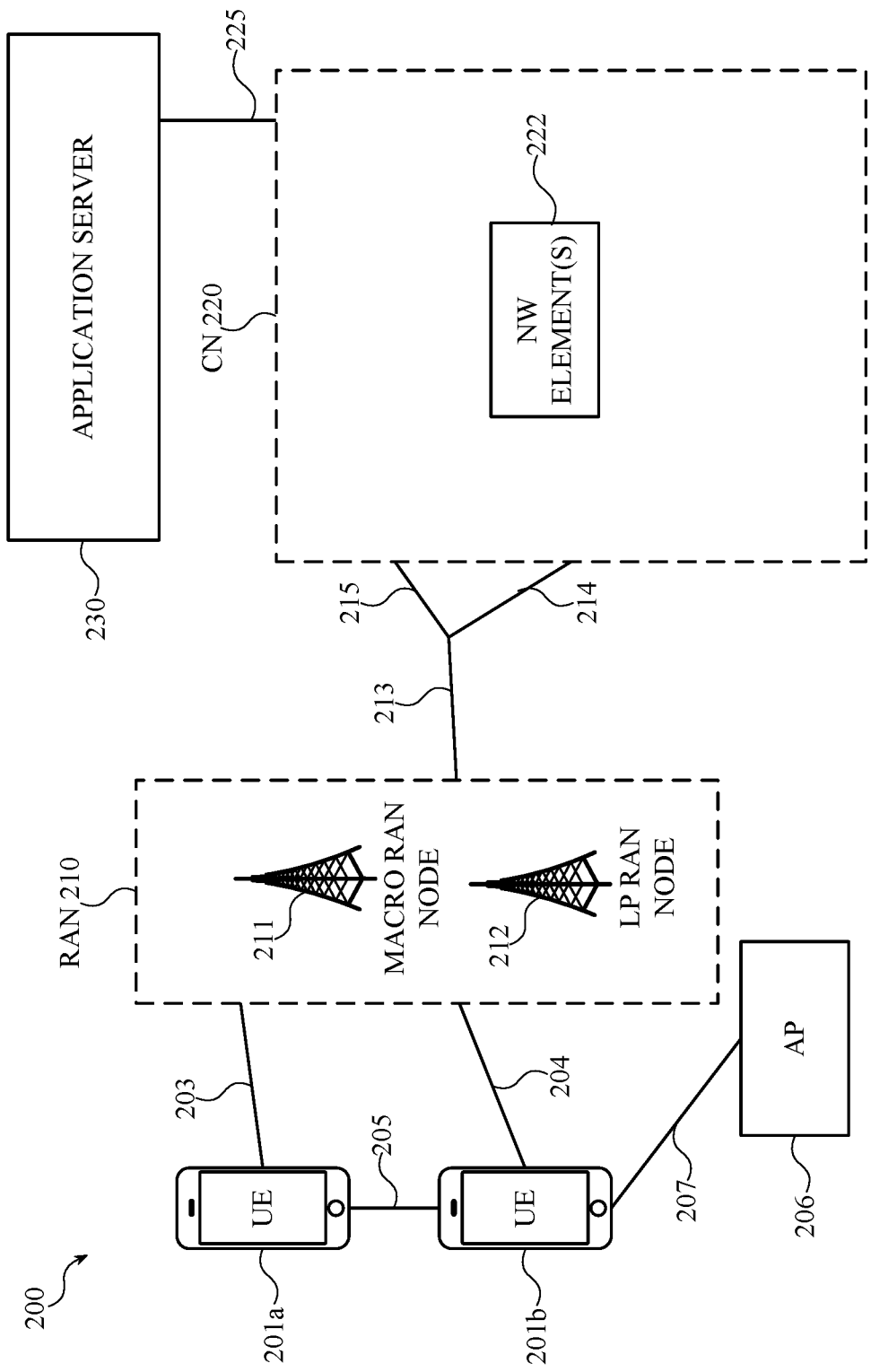
FIG. 2 is an example architecture of a system of a network, in accordance with various embodiments.

FIG. 2 illustrates an example architecture of a system 200 of a network, in accordance with various embodiments. The following description is provided for an example system 200 that operates in conjunction with the LTE system standards and 5G or NR system standards as provided by 2GPP technical specifications. However, the example embodiments are not limited in this regard and the described embodiments can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 2, the system 200 includes UE 201a and UE 201b (collectively referred to as "UEs 201" or "UE 201"). In this example, UEs 201 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 201 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 201 can be configured to connect, for example, communicatively couple, with a Radio Access Network (RAN) 210. In embodiments, the RAN 210 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 210 that operates in an NR or 5G system 200, and the term "E-UTRAN" or the like can refer to a RAN 210 that operates in an LTE or 4G system 200. The UEs 201 utilize connections (or channels) 202 and 204, respectively, each of which comprises a physical communications interface or layer (discussed in further detail below).

In this example, the connections 202 and 204 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In embodiments, the UEs 201 can directly exchange communication data via a ProSe interface 205. The ProSe interface 205 can alternatively be referred to as a SL interface 205 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 201b is shown to be configured to access an AP 206 (also referred to as "WLAN node 206," "WLAN 206," "WLAN Termination 206," "WT 206" or the like) via connection 207. The connection 207 can comprise a local wireless connection, such as a connection consistent with any IEEE 802.11 protocol, wherein the AP 206 would comprise a wireless fidelity (Wi-Fi®) router. In this example, the AP 206 is shown to be connected to the Internet without connecting to the core network of the wireless system (described in further detail below). In various embodiments, the UE 201b, RAN 210, and AP 206 can be configured to utilize LTE-WLAN aggregation (LWA) operation and/or LTE-WLAN Radio Level Integration with IPsec Tunnel (LWIP) operation. The LWA operation can involve the UE 201b in radio resource control RRC_CONNECTED being configured by a RAN node 211a-b to utilize radio resources of LTE and WLAN. LWIP operation can involve the UE 201b using WLAN radio resources (e.g., connection 207) via IPsec protocol tunneling to authenticate and encrypt packets (e.g., IP packets) sent over the connection 207. IPsec tunneling can include encapsulating the entirety of original IP packets and adding a new packet header, thereby protecting the original header of the IP packets.

The RAN 210 can include one or more access nodes (ANs) or RAN nodes 211a and 211b (collectively referred to as "RAN nodes 211" or "RAN node 211") that enable the connections 202 and 204. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 211 that operates in an NR or 5G system 200 (for example, a gNB), and the term "E-UTRAN node" or the like can refer to a RAN node 211 that operates in an LTE or 4G system 200 (e.g., an eNB). According to various embodiments, the RAN nodes 211 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 211 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 211; a Media Access Control (MAC)/Physical (PHY) layer split wherein RRC, PDCP, RLC, and MAC layers are operated by the CRAN/vBBUP and the PHY layer is operated by individual RAN nodes 211; or a "lower PHY" split wherein RRC, PDCP, RLC, MAC layers and upper portions of the PHY layer are operated by the CRAN/vBBUP and lower portions of the PHY layer are operated by individual RAN nodes 211. This virtualized framework allows the freed-up processor cores of the RAN nodes 211 to perform other virtualized applications. In some implementations, an individual RAN node 211 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 210 (not shown) or by a server pool in a similar manner as the CRAN/vBBUP. Additionally or alternatively, one or more of the RAN nodes 211 can be next generation eNBs (ng-eNBs), which are RAN nodes that provide E-UTRA user plane and control plane protocol terminations toward the UEs 201, and are connected to a 5GC via an NG interface.

In V2X scenarios one or more of the RAN nodes 211 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 201 (vUEs 201). The RSU can also include internal data storage circuitry to store intersection map geometry, traffic statistics, media, as well as applications/software to sense and control ongoing vehicular and pedestrian traffic. The RSU can operate on the 5.9 GHz DSRC band to provide very low latency communications required for high speed events, such as crash avoidance, traffic warnings, and the like. Additionally or alternatively, the RSU can operate on the cellular V2X band to provide the aforementioned low latency communications, as well as other cellular communications services. Additionally or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 211 can terminate the air interface protocol and can be the first point of contact for the UEs 201. In some embodiments, any of the RAN nodes 211 can fulfill various logical functions for the RAN 210 including, but not limited to, radio network controller (RNC) functions such as radio bearer management, uplink and downlink dynamic radio resource management and data packet scheduling, and mobility management.

In embodiments, the UEs 201 can be configured to communicate using Orthogonal Frequency-Division Multiplexing (OFDM) communication signals with each other or with any of the RAN nodes 211 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 to the UEs 201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 201 and the RAN nodes 211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 201 and the RAN nodes 211 can operate using Licensed Assisted Access (LAA), eLAA, and/or feLAA mechanisms. In these implementations, the UEs 201 and the RAN nodes 211 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 201 RAN nodes 211, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 201, AP 206, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds ($\mu s$); however, the size of the CWS and a maximum channel occupancy time (MCOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of five CCs can be aggregated, and therefore, a maximum aggregated bandwidth is 100 MHz. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 201 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 201. The physical downlink control channel (PDCCH) carries information about the transport format and resource allocations related to the PDSCH channel, among other things. It can also inform the UEs 201 about the transport format, resource allocation, and Hybrid Automatic Repeat Request (HARQ) information related to the uplink shared channel. Typically, downlink scheduling (assigning control and shared channel resource blocks to the UE 201b within a cell) can be performed at any of the RAN nodes 211 based on channel quality information fed back from any of the UEs 201. The downlink resource assignment information can be sent on the PDCCH used for (e.g., assigned to) each of the UEs 201.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 211 can be configured to communicate with one another via interface 212. In embodiments where the system 200 is an LTE system, the interface 212 can be an X2 interface 212. The X2 interface can be defined between two or more RAN nodes 211 (e.g., two or more eNBs and the like) that connect to evolved packet core (EPC) or core network 220, and/or between two eNBs connecting to EPC 220. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 201 from an SeNB for user data; information of PDCP PDUs that were not delivered to a UE 201; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 200 is a 5G or NR system, the interface 212 can be an Xn interface 212. The Xn interface is defined between two or more RAN nodes 211 (e.g., two or more gNBs and the like) that connect to 5GC 220, between a RAN node 211 (e.g., a gNB) connecting to 5GC 220 and an eNB, and/or between two eNBs connecting to 5GC 220. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 201 in a connected mode (e.g., CM-CONNECTED) including functionality to manage the UE mobility for connected mode between one or more RAN nodes 211. The mobility support can include context transfer from an old (source) serving RAN node 211 to new (target) serving RAN node 211; and control of user plane tunnels between old (source) serving RAN node 211 to new (target) serving RAN node 211. A protocol stack of the Xn-U can include a transport network layer built on Internet Protocol (IP) transport layer, and a GPRS Tunneling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 210 is shown to be communicatively coupled to a core network—in this embodiment, core network (CN) 220. The CN 220 can comprise a plurality of network elements 222, which are configured to offer various data and telecommunications services to customers/subscribers (e.g., users of UEs 201) who are connected to the CN 220 via the RAN 210. The components of the CN 220 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 220 can be referred to as a network slice, and a logical instantiation of a portion of the CN 220 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 230 can be an element offering applications that use IP bearer resources with the core network (e.g., Universal Mobile Telecommunications System Packet Services (UMTS PS) domain, LTE PS data services, etc.). The application server 230 can also be configured to support one or more communication services (e.g., VoIP sessions, PTT sessions, group communication sessions, social networking services, etc.) for the UEs 201 via the EPC or CN 220.

In embodiments, the CN 220 can be a 5GC (referred to as "5GC 220" or the like), and the RAN 210 can be connected with the CN 220 via an NG interface 212. In embodiments, the NG interface 212 can be split into two parts, an Next Generation (NG) user plane (NG-U) interface 214, which carries traffic data between the RAN nodes 211 and a User Plane Function (UPF), and the S1 control plane (NG-C) interface 215, which is a signaling interface between the RAN nodes 211 and Access and Mobility Management Functions (AMFs). The Core network CN 220 can also be a 5GC 220.

In embodiments, the CN 220 can be a 5G CN (referred to as "5GC 220" or the like), while in other embodiments, the CN 220 can be an EPC). Where CN 220 is an EPC (referred to as "EPC 220" or the like), the RAN 210 can be connected with the CN 220 via an S1 interface 212. In embodiments, the S1 interface 212 can be split into two parts, an S1 user plane (S1-U) interface 214, which carries traffic data between the RAN nodes 211 and the S-GW, and the S1-MME interface 215, which is a signaling interface between the RAN nodes 211 and MMEs.

Figure 3:
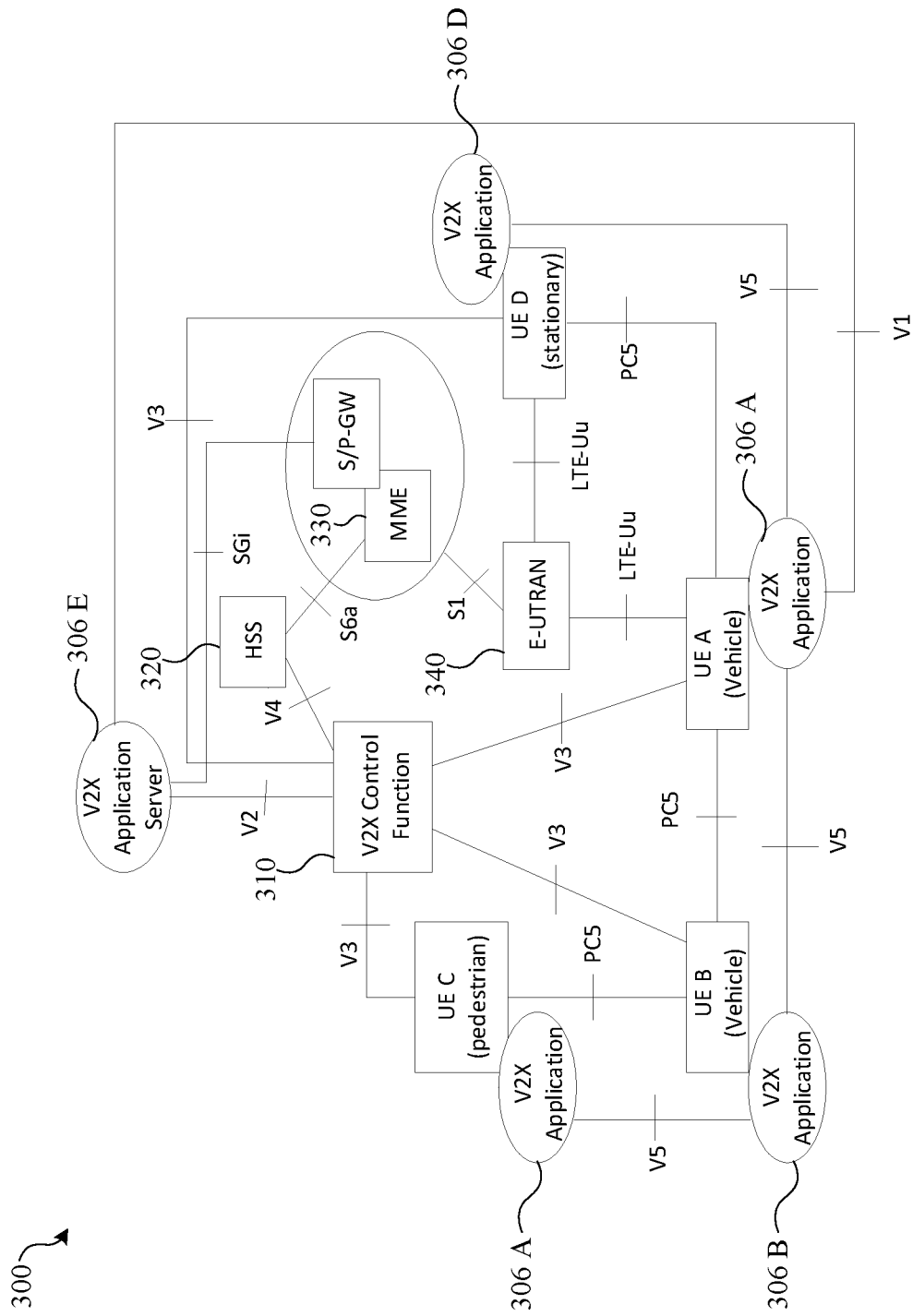
FIG. 3 illustrates an example architecture for PC5 and Uu-interface based V2X communication, in accordance with various embodiments

FIG. 3 illustrates an example architecture for PC5 and Uu-interface based V2X communication, in accordance with various embodiments. In the FIG. 3, UE A (which can be the same or similar as UE 201a in FIG. 2) uses a subscription of PLMN A and UE B (which can be the same or similar as UE 201b in FIG. 2) uses a subscription of PLMN B; UE A can be roaming in PLMN B while UE B is not roaming. A V2X Application Server 306A can connect to multiple PLMNs, e.g., one V2X Application Server can connect with the V2X Control Function 306B in PLMN A and the V2X Control Function in PLMN B in FIG. 3. The V2X Control Function 306A thru 306E can be referred to generally as V2X Control Function 306.

There are two modes of operation for V2X communication, namely over the PC5 and over the Uu-interface. The Uu-interface (or simply "Uu") can be the LTE-Uu or NR-Uu interface. Communication over the Uu-interface can be unicast and/or MBMS. These two operation modes can be used by a UE independently for transmission and reception, for example, a UE can use MBMS for reception without using Uu-interface for transmission. A UE can also receive V2X messages via Uu unicast downlink. For both operation modes, V2X Application Servers (e.g., in the same or different domains) can communicate with each other for the exchange of V2X messages. Any suitable interface between V2X Application Servers can be used and any suitable mechanism can be used for the exchange of messages between the V2X Application Servers. For both operation modes, ProSe discovery feature ("ProSe Direct Discovery," see e.g., 3GPP TS 23.303, clause 5.3) is not required for V2X Services. The ProSe discovery feature can be used by a V2X supporting UE, but that is up to UE implementation. Subject to regional regulations, lawful interception requirements can also apply to V2X Services. Furthermore, one or more RSUs (e.g., RAN nodes 211) can be used in some implementations by co-locating a V2X application logic/server with some entities shown by FIG. 3, for example, collocating V2X application logic/server with one or more vUEs 201, RAN nodes 201, and/or LGWs.

As shown by FIG. 3, V2X communications can involve the following reference points: a V1 reference point between the V2X application in the UE (e.g., UE 201 as UEs A thru D) and in the V2X Application Server; a V2 reference point between the V2X Application Server and the V2X Control Function 306 310 in the operator's network wherein the V2X Application Server can connect to V2X Control Function 306s 310 belonging to multiple Public Land Mobile Networks (PLMNs); a V3 reference point between the UE 201 and the V2X Control Function 306 in UE's home PLMN, which is based on the service authorization and provisioning part of the PC3 reference point defined in clause 5.2 of 3GPP TS 23.303 and is applicable to both PC5 and Uu-interface based V2X communication and optionally Multimedia Broadcast and Multicast Service (MBMS) and Uu-interface based V2X communication; a V4 reference point between the Home Subscriber Server (HSS) 320 and the V2X Control Function 306 310 in the operators network; a V5 reference point between the V2X applications in the UEs (UE A thru D, as UEs 201 of FIG. 2). This reference point is not specified in this release of the specification; a V6 reference point between the V2X Control Function 306 310 in the Home Public Land Mobile Network (HPLMN) and the V2X Control Function 306 310 in the Visited Public Land Mobile Network (VPLMN); a PC5 reference point between the UEs used for user plane for ProSe Direct Communication for V2X Service; an S6a reference point, which in addition to the relevant functions discussed herein and/or in 3GPP TS 23.401, the a V2X Service S6a reference point used to download V2X Service related subscription information to Mobility Management Entity (MME) 330 during Evolved UTRAN (E-UTRAN) attach procedure or to inform MME 330 subscription information in the HSS 320 has changed; an S1 for control plane (S1-MME) reference point, which in addition to the relevant functionality discussed herein and/or in 3GPP TS 23.401, for S1-MME for V2X Service it is also used to convey the V2X Service authorization from MME 330 to eNodeB (e.g., RAN node 211 of FIG. 2); an xMB reference point between the V2X Application Server (e.g., Content Provider) and the Broadcast Multicast Service Center (BM-SC), and defined in 3GPP TS 26.348; an MB2 reference point between the V2X Application Server and the BM-SC, and defined in 3GPP TS 23.468; the SGmb/SGi-mb/M1/M3 reference points internal to the MBMS system and defined in 3GPP TS 23.246; and the Uu-interface reference point between the UE 201 and the E-UTRAN 340.

The V2X Control Function 306 is a logical function (e.g., operated by one or more physical or virtual computing elements) that is used for network related actions required for V2X. There can be one or more logical V2X Control Function 306s in each PLMN that supports V2X Services depending on the implementation. If multiple V2X Control Function 306s are deployed within the same PLMN (e.g., for load reasons), then a suitable mechanism can be employed to locate the specific V2X Control Function 306 (e.g., through a database lookup, etc.) for a particular vUE. The V2X Control Function 306 is used to provision the UE with necessary parameters in order to use V2X communication. It is used to provision the UEs with PLMN specific parameters that allow the UE to use V2X in this specific PLMN. V2X Control Function 306 is also used to provision the UE with parameters that are needed when the UE is "not served by E-UTRAN". The V2X Control Function 306 can also be used to obtain V2X USDs for UEs to receive MBMS based V2X traffic, through V2 reference point from the V2X Application Server. The V2X Control Function 306 can also obtain the parameters required for V2X communications over PC5 reference point, from the V2X Application Server via the V2 reference point. The V2X Control Function 306 of HPLMN is discovered through interaction with the Domain Name Service (DNS) function. The FQDN of a V2X Control Function 306 in the Home PLMN can either be pre-configured in the UE, provisioned by the network or self-constructed by the UE, e.g., derived from the PLMN ID of the HPLMN. The IP address of a V2X Control Function 306 in the Home PLMN can also be provisioned to the UE.

The UEs exchange V2X control information between the UE and the V2X Control Function 306 over the V3 reference point, and performs various procedures for V2X communication over the PC5 reference point and/or the Uu-interface reference point. The UEs also support configuration of parameters for V2X communication (e.g., destination Layer-2 IDs, radio resource parameters, V2X Application Server address information, mapping between service types and V2X frequencies). These parameters can be pre-configured in the UE, or, if in coverage, provisioned by signaling over the V3 reference point from the V2X Control Function 306 in the HPLMN. The UEs can be provided with V2X User Service Domains (USDs) for receiving MBMS based V2X traffic via existing MBMS service announcement mechanisms, or provisioned from V2X Control Function 306, or provisioned from the V2X Application Server via V1 reference point. The UEs can be provisioned with V2X Server USDs for receiving V2X Application Server information via MBMS.

In embodiments where the Uu-interface is the NR-Uu interface, the NR-Uu interface supports having multiple active UL configured grants in a given BWP in a given cell, of which not more than one is used simultaneously for transmission by the UE. Downlink Control Information (DCI) is used to identify the type-2 UL configured grant to be activated or deactivated. The UE can report assistance information to the gNB including at least UE-related geographic information such as position and, at least for periodic traffic, reports of Uu and SL V2X traffic periodicity, timing offset, and message size. Rel-15 NR does not support multicast/broadcast over the Uu-interface. There are two technologies for Uu multicast/broadcast in 3GPP: multimedia broadcast single frequency network (MBSFN) and single-cell point-to-multipoint (SC-PTM), both supported in LTE. NR Uu multicast/broadcast are beneficial at least in terms of resource utilization for V2X use cases in some scenarios. In these embodiments, the NR Uu can assign NR SL resources for the cases of (i) a licensed carrier shared between NR Uu and NR SL; and (ii) a carrier dedicated to NR SL. The following techniques are supported for resource allocation Mode 1: dynamic resource allocation; and configured grant Type 1 and Type 2.

To support V2X SL communication, the RRC layer provides at least the following functionalities in Uu: acquisition of V2X-specific SIB(s); establishment of RRC connection for V2X SL communication: For the UE configured by upper layers to transmit V2X SL communication, and having data to transmit, an RRC connection is established at least if the frequency on which the UE is configured to transmit for SL communication is included in the V2X-specific SIB(s), without the inclusion of transmission resource pool for that frequency; configuration of resource allocation modes for V2X communication in SL including resource allocation Mode 1 and Mode 2 can be configured at the same time for the UE, network provided pools of resources in which UE autonomously selects sidelink grant for 'sidelink unicast/groupcast/broadcast' via broadcast system information and/or dedicated signaling, and mode 2 resource configuration can be provided for a given validity area where UE does not need to acquire a new Mode 2 resource configuration while moving within the validity area, at least when this configuration is provided by System Information Block (SIB) (e.g., reuse valid area of New Radio (NR) SIB).

Mobility management by Access Mobility Management Function (AMF) involves, during handover, the transmission and reception of V2X sidelink (SL) communication are performed based on at least configuration of the exceptional transmission resource pool and reception resource pool of the target cell, which can be used by the UE during handover, are provided in the handover command. Cell selection and reselection for V2X SL communication are performed based on at least the following criteria and configurations: the carrier frequencies that can provide V2X SL resource configuration or inter-frequency configuration can be (pre-)configured; the frequencies providing inter-frequency V2X SL configurations are prioritized during cell (re)selection; and it is up to UE implementation how to minimize the interruption of V2X SL transmission and reception during cell reselection. Mobility management (e.g., by AMF) also involves reporting of UE SL information; SL-related measurement and reporting, including: measuring and reporting of Channel Busy Ratio (CBR), and reporting of location information; and reporting of UE assistance information for traffic pattern(s) (periodicity, offset and packet size), at least for periodic traffic.

The V2X Application Server (V2X Access Stratum (AS)) can be the same or similar as application server 230 of FIG. 2. The V2X AS receives uplink data from the UEs over respective unicast channels, and delivers data to the UE(s) in a target area using Unicast Delivery and/or MBMS Delivery. The V2X AS includes a mapping from geographic location information to appropriate target Multimedia Broadcast and Multicast Service Service Area Identifier (MBMS SAI)(s) for the broadcast, a mapping from geographic location information to appropriate target 3GPP ECGI(s) for the broadcast, and a mapping from UE provided E-UTRAN Cell Global Identifier (ECGI) to appropriate target MBMS SAI (s) for the broadcast. The V2X AS provides the appropriate ECGI(s) and/or MBMS SAI(s) to BM-SC. The V2X AS is also pre-configured with Local MBMS (L.MBMS) information (e.g., IP multicast address, multicast source (SSM), C-TEID), and is pre-configured with L.MBMS's IP address and port number for the user-plane. The V2X AS sends L.MBMS information to the BM-SC, requests BM-SC for allocation/de-allocation of a set of Temporary Mobile Group Identities (TMGIs), and requests BM-SC for activating/deactivating/modifying the MBMS bearer. The V2X AS provides the V2X User Service Descriptions (USDs) for UE to receive MBMS based V2X traffic to V2X Control Function 306, provides the parameters for V2X communications over PC5 reference point to V2X Control Function 306, and provides the parameters for V2X communications over PC5 reference point to the UEs.

In addition to the functions discussed herein and defined in 3GPP TS 23.401 and 3GPP TS 23.246, the MME obtains subscription information related to V2X as part of the subscription data, and provides indications to the E-UTRAN 340 about the UE authorization status on V2X use.

In addition to the functions defined in 3GPP TS 23.246 and 3GPP TS 23.468, the BM-SC receives L.MBMS information from V2X Application Server, and sends L.MBMS information to the MBMS gateway (MBMS-GW).

In addition to the functions defined in 3GPP TS 23.246, the MBMS-GW skips the allocation procedure for IP multicast distribution, e.g., allocating an IP multicast address if/when the MBMS-GW is to receive L.MBMS information from the BM-SC.

Quality of Service (QoS) management is relevant to V2X in the context of its use in resource allocation, congestion control, in-device coexistence, power control, Sidelink Radio Bearer (SLRB) configuration, and admission control. QoS management for the Uu interface, as specified in 3GPP TS 23.501, is based on QoS parameters (e.g., 5G QoS Indicator (5QI), Allocation/Retention Priority (ARP), Recurrence Quantification Analysis (RQA), Guaranteed Flow Bit Rate (GFBR), Maximum Flow Bit Rate (MFBR), notification control and maximum packet loss rate). Admission control is performed before establishing a QoS flow, which corresponds to a radio bearer. In case there are not enough free resources, the QoS flow can be rejected or an existing QoS flow can be preempted depending on its ARP.

Assuming the QoS flow is accepted, it will be further treated in the network according to other QoS parameters. A 5QI value corresponds to multiple QoS characteristics, namely resource type (e.g., Guaranteed Bit Rate (GBR), Delay critical GBR or Non-GBR), priority level, packet delay budget, packet error rate, averaging window, and maximum Data Burst Volume (for Delay-critical GBR resource type only). Physical layer parameters related to QoS management are the priority, latency, reliability and minimum required communication range (as defined by higher layers) of the traffic being delivered. Data rate requirements are also supported in the AS. An SL congestion metric and, at least in resource allocation mode 2, mechanisms for congestion control can be supported where the SL congestion metric is reported to the gNB. For SL unicast, groupcast and broadcast, QoS parameters of V2X packets are provided by upper layers to the AS. For V2X sidelink transmission in SL unicast, groupcast and broadcast the SLRBs can be (pre-)configured according to 3GPP TR 38.885 clause 7, for example. For NR SL unicast, the PC5 QoS flow to SLRB mapping is performed in the Service Data Adaptation Protocol (SDAP) layer of the UE. Some SLRB configurations, including at least sequence number (SN) length, radio link control (RLC) mode and PC5 QoS profile associated with each SLRB, for unicast can be informed by one UE to the peer UE in SL, when they are (pre)configured at the UE.

The UE or network (NW) (e.g., a RAN node 211) can perform admission control directly on the QoS flow associated with a given V2X service, which maps to one radio bearer. The admission control can be applicable both for UE-autonomous resource allocation/selection and gNB-scheduled resource allocation. The admission control decision can be made based on the required QoS characteristics described herein of an incoming flow (e.g., data rate, packet delay budget (PDB), reliability, ARP, and the channel congestion). Depending on the UE's subscription data, the Mobile Network Operation (MNO) can provide different priority treatments to different UEs running the same service. ARP can be used to reflect such difference, for example, when channel is congested, the NW/UE can drop the QoS flow of high ARP for newly arrived QoS flow of low ARP.

Admission control in the Uu interface can be based on explicit bearer request and configuration signaling. Additionally or alternatively, admission control for SL, such as V2X SL transmissions, can be based on explicit bearer request and configuration signaling when in gNB-scheduled mode (e.g., mode 1). For mode-1, explicit admission control signaling can be used to request/configure/reject/preempt an SL QoS flow between the UE and gNB. In these embodiments, the UE can notify the gNB about the presence of a new incoming QoS flow, and the gNB can accept/reject the UE request, or even preempt other ongoing flows/bearers. For UE autonomous resource allocation/selection, (pre)configuration can provide different congestion thresholds for the different QoS properties so that the transmitting UE can perform admission control on the basis of (pre)configured rules. For mode-2, the admission control on an incoming SL QoS flow is performed by a transmitting UE following (pre)configured criteria (e.g., provided via RRC/SIB). In autonomous mode, packet level pre-emption among UEs can also be used.

In first embodiments, admission control for V2X SL can be on a per-service basis only ("per-service admission control"). In these embodiments, once the UE decides to initiate a particular V2X service, the UE checks whether or not it is authorized to perform V2X transmission on the interested frequency. In these embodiments, the NW (e.g., gNB) configures a mapping between specific V2X services and carrier frequencies, and the mapping indicates the particular services for which the UE is not authorized to perform V2X transmissions. In such embodiments, the UE refers to this mapping to determine whether the V2X transmission is permitted on the interested frequency based on a V2X service type of that V2X transmission. In some embodiments, the mapping can be configured by the NW using dedicated RRC signaling, broadcasted system information. In other embodiments, the mapping can be hard-coded in the UE (e.g., in a Universal Integrated Circuit Card (UICC) or eUICC, or the like). Note that this type of admission control per service does not take into account the dynamic channel conditions over sidelink.

In second embodiments, admission control for V2X SL can be on a per-packet basis only ("per-packet admission control"). In these embodiments, the UE determines whether it can initiate any V2X transmission over a given sidelink frequency based on NW (e.g., RAN node 211) authorization, regardless of the V2X service initiated at the UE. In these embodiments, the UE is also configured with a CBR-QoS criteria mapped to Tx parameter configuration by the NW (e.g., a CBR-QoS criteria to Tx parameter(s) mapping table). In such embodiments, a specific point in the mapping table can be reserved corresponding to no transmission (e.g., unused or reserved values). When the V2X transmission is permitted, the UE then performs SL measurements for channel conditions and determines the channel load status (e.g. CBR). Subsequently, this information can optionally be used together with the QoS information for each packet passed down to the AS layer and the CBR-QoS criteria configured by the NW to determine, for each packet, whether it can be transmitted or not.

In some second embodiments, the NW can indicate the QoS information only regardless of the current channel load status. In these embodiments, the PQI and any additional QoS determinants (e.g., a delay tolerance or a reliability threshold) might be indicated as the QoS information. In some embodiments, the QoS information can indicate the particular PQI values are allowed or disallowed from transmission. This is because, in some cases, a simple comparison can or can not always be possible since the PC5 Quality Indicator (PQI) is a combination of several QoS factors. The QoS information can be indicated via system information broadcast for a given Tx pool or via dedicated RRC configuration. In these embodiments, the UE 201 (or any one of UEs A thru D) can not transmit any V2X packets with QoS other than that indicated in a configured mapping, for example.

In other second embodiments, the channel load status can be taken into account. In these embodiments, a CBR-POI-Tx Parameter table can be configured at the UE 201 (or any one of UEs A thru D), and the UE 201 (or any one of UEs A thru D) consults the configured table for a packet to determine the exact Tx parameters to apply for that packet. The Tx parameters can include, for example, Modulation Coding Scheme (MCS) index, TX power, number of potential retransmissions, and/or other like Tx parameters. This allows for a more fine-tuned control over the congestion levels based on the packet's V2X Qos Indicator/Indication (VQI) (and/or other packet parameters). For example, a packet with a very high priority VQI can be allowed transmission even if the channel load is relatively high, while another packet, from the same or different service, with a lower priority VQI can be barred from transmission. In these embodiments, other QoS factors, apart from priority, can also be considered. In order to accomplish this behavior, a specific point in the mapping table can be reserved corresponding to no transmission (e.g., unused or reserved values), which essentially means that no matter what the PQI of the V2X packet, the UE cannot transmit that packet over the sidelink interface.

In third embodiments, admission control for V2X SL can be on a combined per-service and per-packet basis ("per-service/per-packet admission control"). These embodiments consider both the V2X service and the QoS of the V2X packet alongside the channel load status. In these embodiments, when a V2X service is initiated, the UE can utilize the current load status of the channel to determine whether the V2X service is initiated at all. This can be accomplished by the NW configuring a mapping between V2X services and channel load (e.g., CBR) in addition to the mapping between V2X services and sidelink frequencies as in the first embodiments. In this way, even if a UE is permitted to transmit over a particular V2X frequency for a particular V2X service, the UE can not be allowed to generate and submit packets to the AS layer for transmission if the channel load is too high. In these embodiments, the NW can configure a V2X service-frequency mapping and V2X service-CBR mapping jointly or separately. If a high-priority service is allowed transmission based on the aforementioned criteria, the per-packet congestion control mechanism is further applied for packets of that service to ensure that only essential packets are transmitted over the SL interface. The service in these embodiments can also refer to a new QoS flow coming in from higher layers belonging to a service already initiated. The QoS flow has a QoS Flow indicator/indication (QFI) (or 5QI) that can be used to determine the priority of the packets.

Figure 4:
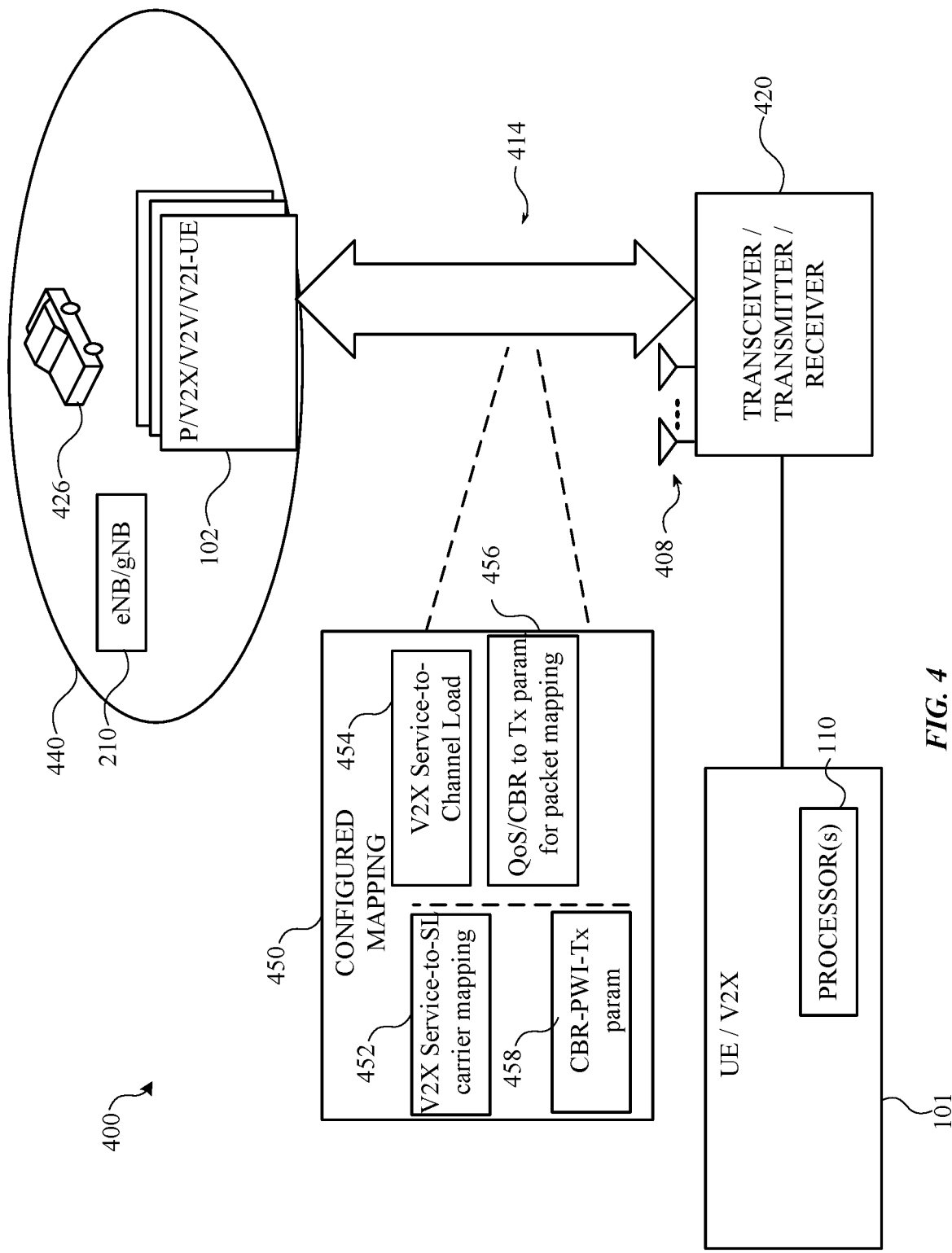
FIG. 4 is a block diagram for processing vehicle-to-everything sidelink communications for an admission/congestion control scheme according to various embodiments described herein.

Referring to FIG. 4, illustrated is a block diagram of a system 400 employable at UE/V2X 101 (as UE 201, or UE A thru D), or participating/peer entities 440 in direct peer-to-peer communication, including gNB 210 or other vUEs 102. System 400 can include processor(s) 410 comprising processing circuitry and associated interface(s) (e.g., a communication interface for communicating with communication circuitry 420, a memory interface for communicating with memory 440, etc.), communication circuitry 420 (e.g., comprising circuitry for wired and/or wireless connection(s), e.g., transmitter circuitry (e.g., associated with one or more transmit chains) and/or receiver circuitry (e.g., associated with one or more receive chains). This transmitter circuitry and receiver circuitry of transceiver 420 can employ common or distinct circuit elements, or a combination thereof). The memory 440 can comprise any of a variety of storage mediums and can store instructions or data associated with one or more of processor(s) 410 or the communication circuitry 420. In embodiments, signaling or messaging between different embodiments of system 400 can be generated by processor(s) 410, transmitted by communication circuitry 420 over a suitable interface or reference point (e.g., PC5, etc.), received by communication circuitry 420, and processed by processor(s) 410.

The UE 101 can receive V2X configuration information when the UE is authorized to use V2X services over the 4GPP network. This authorization is done by a V2X function in the core network, and part of the authorization procedure the V2X function can send a list of preferred air interface technologies, for example. Alternatively, V2X configuration can be performed by an application server that is not part of the core network. The UE 101 can employ one or more channel quality measurements such as power measurements or other measurements related to sidelink communication for direct peer-to-peer communication.

V2X UEs can be in a given coverage area inside a cell covered by an gNB 210 that supports 5G, LTE and dedicate short range communication (DSRC) road side unit (RSU) functionality. These UEs 440 can notify the gNB/RSU which V2X communication radio access technology(ies) (RAT(s)) is/are supported. Based on that information, the network can choose an access technology for the UEs to use. The system 400 includes vehicle/traffic participant entities 440. The vehicle/traffic participant entities 440 include one or more pedestrian devices (P-UEs) 422, infrastructure entities 424 (e.g., RAN 220), vehicle entities 426, or other network device(s)/component(s). The V2X UE 101 can also include one or more antenna 408 for communications, which includes sidelink communications 414 with the vehicle/traffic participant entities or peer devices 440.

The vehicle communications between the V2X UE 101 and any vehicle/pedestrian device entities 440 can utilize co-operative awareness that includes information from other vehicles, sensors and the like, to process and share the information to provide vehicle services such as collision warning, autonomous driving, and the like. The V2X UE 101 is configured to obtain, select or determine QoS attributes associated with sidelink communications. Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 4GPP, or the like. For example, the frame structure has parameters including sampling rate, frame length, subframe length, subcarrier spacing and cyclic prefix length and are based on the obtained success ratio.

The sensing operations can be a simplified sensing procedure for V2X UE resource selection aiming to reduce complexity and power consumption. In general, the principles of sensing and resource selection procedure can be used for sidelink communication management. The resource (re)selection triggering utilized herein can include a resource reselection counter, a probabilistic reselection based on a probability to reselect one or more resources, and one or more reselection triggering conditions including whether the UE 101, for example, skips transmission on a preconfigured/predetermined number of resource reservation cycles. In particular, modifications could be considered in a resource exclusion operation and sidelink (SL) received signal strength indication (SL-RSSI) averaging of non-excluded resources, or other sidelink channel indication. Such indication, can provide whether the sidelink signal or sidelink synchronization reference has been lost or not available for initial sidelink synchronization, for example.

Embodiments herein include various mechanisms including enhanced NR sidelink communication operations with a PC5 channel 414 between UEs with components, configurations, or processes for resource allocation to enable device-to-device (D2D) or sidelink communications in one or more UEs 101, V-UEs 426, or other networked devices 440 for direct communication between these devices. In PC5 V2X communication, there can be several different combinations between source and peer UEs including one or more of: V2V, V2P, V2I, RSU or other UE as a UE or V-UE as peers participating direct peer-to-peer/sidelink communication in co-ordination with one another.

With the advent of NR V2X use cases, which are expected to be supported both in coverage and out of coverage, there is a need to consider methods for defining efficient mechanisms for providing congestion control among different UEs operating over sidelink performing V2X transmission. To this end, various embodiments provide for performing admission control in a per packet, a per V2X service, or both a per packet and per service manner at the AS layer for autonomous resource selection mode in V2X transmission, where the UEs decide on and select their own resources for V2X sidelink communication based on a configured mapping as the V2X configuration information.

Various embodiments enable the peer devices (e.g., vehicle-to-vehicle device communication) to perform an admission control scheme or a congestion control scheme over NR sidelink. The embodiments discussed herein reduce signaling overhead and the complexity of operation in comparison to existing solutions.

A majority of the NR V2X use cases, such as platooning and advanced driving, as a V2X service, can be expected to be somewhat agnostic to network coverage. In other words, any given vUE 101 (e.g., UE A thru D of FIG. 3 or other UEs as vUEs 201) that performs V2X transmissions for a given V2X service may be in coverage or out of coverage at any given time. Additionally, it is expected that the Quality of Service (QoS) afforded to the vUE 101, 102 should not be substantially impacted depending on its coverage status.

NR V2X includes two distinct modes of resource allocation/scheduling operation over sidelink: Mode 1 and Mode 1. In mode 1 or a first mode, the gNB 210 or BS, for example, can schedule SL resource(s) to be used by UE for SL transmission(s). In mode 2, or a second mode, UE 101 can determine autonomously or on its own transmission resource(s) within SL resources configured by the gNB 210, BS network or pre-configured SL resources such that the BS does not schedule SL.

While operation in mode 1 can be in the control of the BS or gNB 210, for mode 2, in order to ensure the above QoS requirement, there is a need to develop some mechanism for admission control wherein all V2X transmissions over shared sidelink resources take into account the channel load status. In LTE, such a congestion control mechanism takes into account the ProSe Per-Packet Priority (PPPP) (ProSe Per-Packet Priority, defined in clause 5.4.6.1 TS 24.404 for V2X over the PC5 connection) and the Channel Busy Ratio CBR to control the transmit Tx parameters such as Tx power at each UE 102 or vUE 201, 426, or UE A thru D, or the like peer device in sidelink communication. This ensures that the network (NW) can still mediate transmission of V2X packets based on their priority in a somewhat decentralized manner, as in mode 2.

For NR, it is expected that a similar congestion control metric (e.g., based on averaging over sub-channels for a Tx resource pool) will be defined and can be considered as an indication of the current channel load status. In addition, the NR V2X QoS mechanism has been redesigned from the ground up to be more robust and holistic than the simplistic PPPP and ProSe Per-Packet Reliability (PPPR) metrics in LTE. Any given packet is expected to have a PC5 Quality Indicator ((PQI), where PC5 refers to the sidelink interface between peer UEs) and additional identifiers associated with it, for example, PC5 QoS Flow ID (QFI) (which can directly map to PQI or be defined as a scalar value). The QFI can be mapped or map to specific QoS requirements that are to be met when transmitting the packet. Therefore, at least the PQI can be considered as the QoS determinant for that packet.

With the above information being available at one or more vUEs, the admission control at the AS layer can be performed. In addition to the packet itself, the V2X service that generated the given packet may also be taken into account in the admission control procedure for determining whether a packet can be transmitted via the AS layer in sidelink transmission. In this regard, different considerations can be configured in determining or configured authorized/unauthorized transmissions, including an admission control per V2X service only, admission control per packet only, or admission control according to both a per packet and per service control.

In one embodiment, once a given V2X UE 101 decides to initiate a particular V2X service, the vUE 101 first checks whether or not it is authorized to perform V2X transmission on the interested sidelink frequency. This operation can be based on V2X service or V2X service type, which can include a priority level of the V2X service include one or more of a platooning operation, an autonomous driving, a sensor sharing, an intelligent transportation service (ITS), or the like. The NW or gNB 101 can configure a mapping as a configured mapping or configured mapping table 450 between specific V2X services and carrier frequencies as a V2X-to-SL carrier mapping table 452 such that the UE or vUe 101, 102, or the like is barred from performing any V2X transmissions for a particular V2X service if it is not allowed according to such mapping. This mapping 450 can be through NW configuration either via dedicated RRC signaling or broadcasted system information or it can be hard-coded as pre-defined in the specification. This type of admission control per V2X service does not take into account the dynamic channel conditions over sidelink.

As such, in other embodiments the admission control scheme can take into account each packet and associated QoS per packet. In this embodiment, the UE or vUe 101, 102, or the like still determines or checks on whether it can initiate any V2X transmission over a given PC5 sidelink frequency based on NW authorization via the configured mapping table 450, for example. However, this is regardless of the V2X service initiated at the UE or vUe 101, 102, or the like. Additionally, the UE or vUe 101, 102, or the like can be also a configured mapping 456 with a CBR-QoS criteria mapped to one or more TX parameter configuration(s) by the network. If V2X transmission is permitted, the UE then performs sidelink measurements for channel conditions and determines the channel load status (e.g., CBR). Additionally, or alternatively, this information can be used together with the QoS information for each packet passed down to the AS layer and the CBR-QoS criteria configured mapping 454 by the NW to determine (for each packet) whether it can be transmitted or not. There can be at least two approaches or schemes for accomplishing this per-packet admission control.

In a first approach, for example, the NW can indicate the QoS information only, i.e. regardless of the current channel load status, the PQI (and any additional QoS determinants such as, for example, a delay tolerance or a reliability threshold) can be indicated, either broadcasted via system information for a given Tx pool or a group of sidelink communication V2X participants 440, or via a dedicated RRC configuration form a higher layer, where the UE or vUe 101, 102, or the like can not transmit any V2X packets with QoS other than that indicated. Because the PQI specifically can be a combination of several QoS factors, a simple comparison may or may not always be possible and an exact indication of what PQI values exactly are allowed/disallowed from transmission could be communicated via the 450 configured mapping, without or without the mappings 452 and 454.

In a second approach, which can be flexible as it takes into account the channel load status as well, a CBR-PQI-Tx Parameter table 458 can be configured at the UE or vUe 101, 102, or the like. The vUE 101, for example, consults this table 458 for each packet to determine the exact TX parameters (e.g., MCS index, TX power, number of potential retransmissions, etc.) to apply for this packet. This allows for a more fine-tuned control over the congestion levels based on each packet's V2X QoS indicator/identifier (VQI). For example, a packet with VQI such that it corresponds to very high priority might be allowed transmission even if the channel load (or CBR) is relatively high or sufficient to satisfy a priority threshold, while another packet (from the same or different V2X service) with a VQI indicated lower priority might be barred from transmission that does not satisfy the priority threshold or a different low priority threshold. Other QoS factors/criteria apart from priority might also be considered. Also, in order to accomplish the behavior in an configured mapping 450 (e.g., QoS/CBR to Tx parameters (params) 456, or the like), a specific point in a mapping table 450 can be reserved corresponding to no transmission (e.g., unused or reserved values), which essentially means that no matter what the PQI of a V2X packet, the UE 101 or the like cannot transmit that packet over the sidelink interface.

In another embodiment, a combination of factors or configured mappings 450 could also be considered such that both configured mapping(s) 452 and 454 are considered, as well as potentially other factors or mapping criteria (e.g., 456 or 458). For example, considering both the V2X service and the QoS of the V2X packet alongside the channel load status (e.g., CBR) can be defined or taken into account when determining whether a packet can be transmitted via an AS layer as part of SL communication, for example. In this case, for example, when a V2X service is initiated, the UE 101 or the like can utilize the current load status of the channel 414, or otherwise, to determine whether the V2X service is authorized or initiated at all. This can be accomplished by the NW configuring mapping 450 between V2X services and channel load (e.g., CBR) 452, for example, in addition to or in combination with considering the mapping between V2X services and sidelink frequencies as when only considering a configured mapping 450 related to the V2X service type (e.g., 452 or 454). Even if a V2X service might be allowed transmission over a V2X frequency, it could not be allowed to generate and submit packets to the AS layer for transmission if the channel load is too high or satisfying a channel load threshold, for example. The NW can accomplish this behavior by either configuring the V2X service-frequency mapping 452 and the V2X service-CBR mapping 454, jointly or separately. For example, if a high-priority service is allowed transmission based on the above criteria, the per-packet congestion control mechanism can then be further applied (e.g., via mapping 456 or 458) for packets of that service to ensure that only essential packets are transmitted over the sidelink interface, for example. The V2X service can also refer to a new or different QoS flow coming in from a higher layer belonging to a V2X service already initiated, for example, but with one or more different V2X QoSes. The flow can have a QoS flow ID (QFI) that can be used to determine the priority of the packets, as well as the mapping when compared to one or more configured mappings 450.

While considering V2X services only for an admission control or congestion control over the channel 414 for SL communication can be quite simple and light-weight in terms of complexity and signaling overhead, it does not necessarily take into account the channel load status or CBR. Per packet control schemes only consider the packet QoS for admission control, regardless of the corresponding V2X service itself. Considering additionally or alternatively the V2X service to SL carrier mapping 452, or the V2X service to channel load mapping 454 along with or without a packet-based mapping 456 or 458 might not be preferable for situations where channel conditions are varying rapidly. At first glance, this may seems to cover all the basics and include both V2X service and the QoS for each packet into account, it is expected to be more useful if one assumes that a typical V2X service might only generate V2X packets within a narrow band/range of QoS. To elaborate, if V2X service 'priority' itself is something not captured fully by the QoS/PQI of the V2X packet it generates, then a combination of both packet and service considerations could be utilized. In the most general case, if any V2X service can generate packets encompassing a whole range of QoS/PQI, then the combination of configured mappings might lead to some service being barred even if it has high priority packets to send which would otherwise be allowed by the other embodied schemes. From a signaling overhead perspective, a consideration of two or more configured mappings 450 seems to have the most overhead since mapping between services and CBR additionally could also be indicated.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment or example provided within this disclosure and can be applied to any of the systems disclosed herein.

Figure 5:
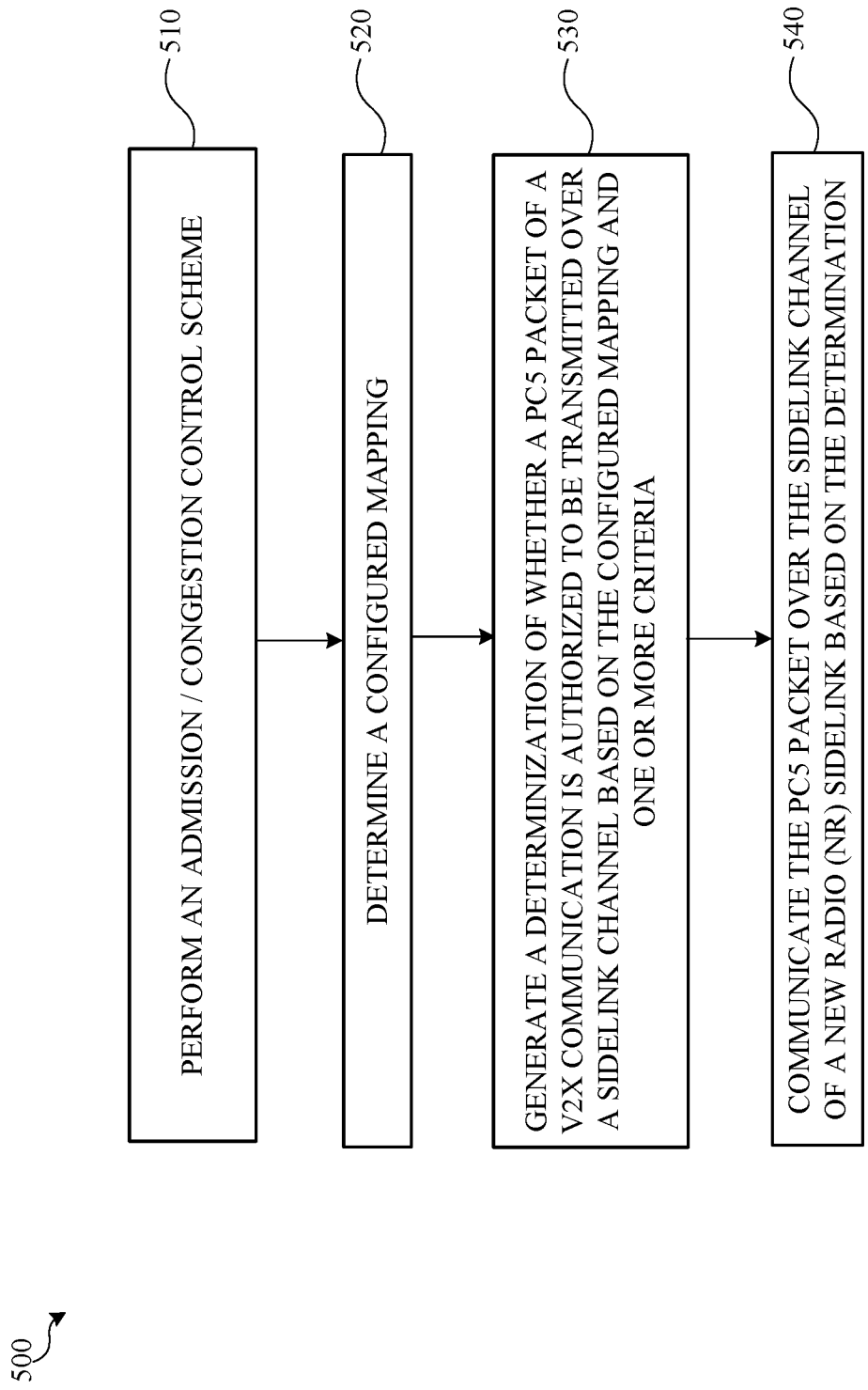
FIG. 5 is a block diagram illustrating an example process flow for vehicle-to-everything sidelink communications for an admission/congestion control scheme according to various embodiments described herein.

Referring to FIG. 5, illustrated is an example process flow 500 for a network device or component (e.g., UE 101, gNB 211, or other network component) to perform admission/congestion control operations for V2X communications among UE peer devices on a sidelink channel.

At 510 the process flow 500 comprises performing an admission control scheme, via processing circuitry. This can include at 520 determining a configured mapping. At 530, the process flow includes generating a determination of whether a PC5 packet of a V2X communication is authorized to be transmitted over a sidelink channel based on the configured mapping and one or more criteria. At 540, the process flow can include communicating the PC5 packet over the sidelink channel of a new radio (NR) sidelink based on the determination.

The process flow 500 can further comprise determining whether the PC5 packet is authorized to be transmitted based on a V2X service of the V2X communication and a sidelink frequency corresponding to the configured mapping. Alternatively, or additionally, the process flow 500 can include determining whether the PC5 packet is authorized to be transmitted based on a QoS factor associated with the PC5 packet and one or more dynamic channel conditions over the sidelink channel mapped to a transmit parameter.

For example, the one or more dynamic channel conditions can comprise a channel load status or a channel busy ratio (CBR). The QoS factor (or criteria) can comprise a QoS criteria including at least one of: a PC5 Quality Indicator (PQI) value, a priority of the V2X service, a priority of the PC5 packet, or a V2X QoS indication (VQI). A V2X service can comprise at least one of: a platooning operation, an autonomous driving, a sensor sharing, or an intelligent transportation service (ITS), and wherein the transmit parameters comprises a modulation and coding scheme (MCS) index, a transmit power, or a number of potential retransmissions.

Other embodiments of the process flow 500 can include processing a first configured mapping and a second configured mapping jointly or independent from one another as the configured mapping, wherein the first configured mapping comprises a V2X service of the V2X communication mapped to a sidelink frequency, and the second configured mapping comprises one or more V2X services mapped to a channel load status. Here, if the first configured mapping fails as a packet of an unauthorized service, then the process flow can halt. If it is authorized, then a second configured mapping or additional configured mapping can be compared to the packet to determine further fine tuning authorization/admission or not for sidelink transmission, for example.

The one or more criteria can comprise at least one of: one or more dynamic channel conditions over the sidelink channel, a PC5 Quality Indication (PQI), one or more Quality of Service (QoS) factors, or one or more transmit parameters. Then a determination can be performed of whether the one or more transmit parameters apply to the PC5 packet based on at least one of: a CBR, a PQI, or a VQI of the PC5 packet mapped in the configured mapping.

In another aspect, a point of the configured mapping or a range of values of any of the parameters herein can be identified that is reserved for no transmission as unused or reserved values over the sidelink channel.

Figure 6:
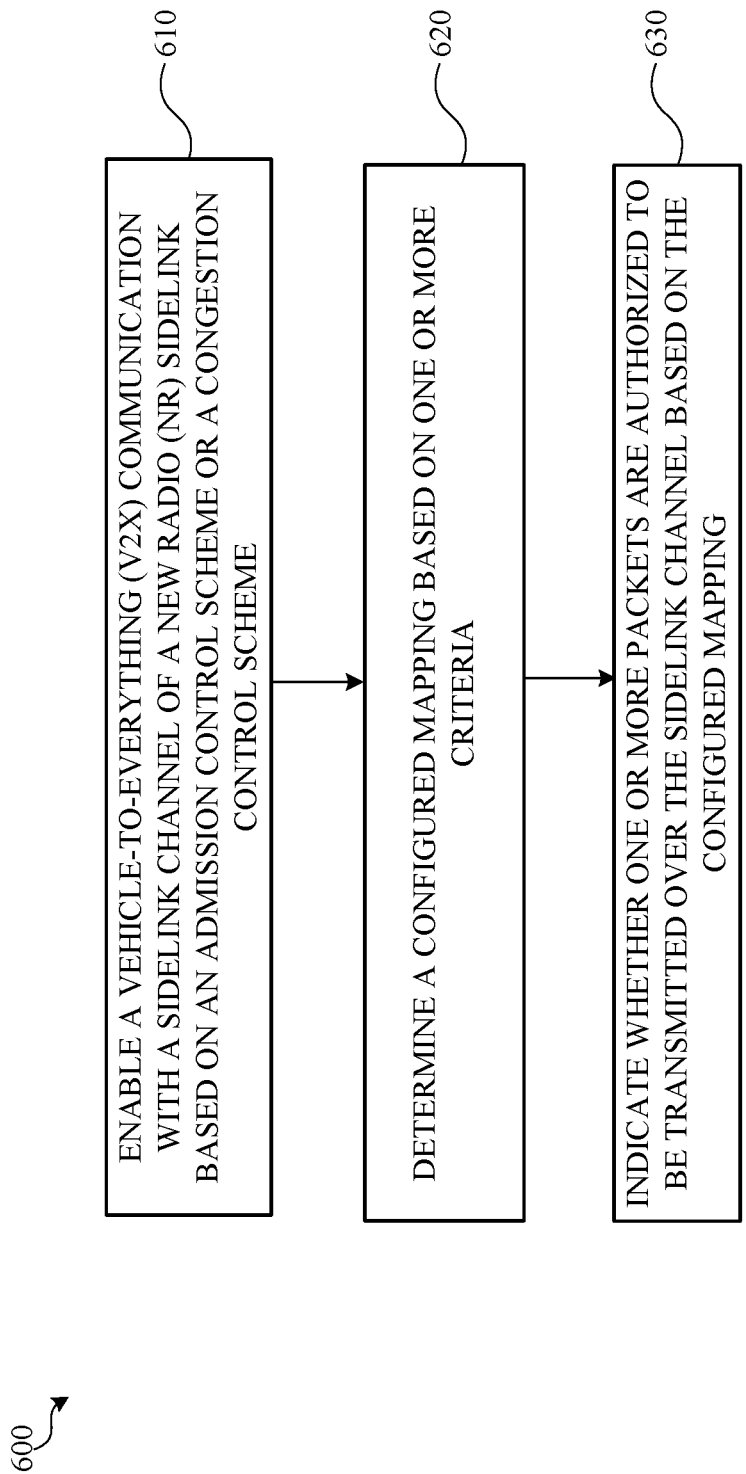
FIG. 6 is another block diagram illustrating an example process flow for vehicle-to-everything sidelink communications for an admission/congestion control scheme according to various embodiments described herein.

Referring to FIG. 6, illustrated is an example process flow 600 for a network device or component (e.g., UE 101, gNB 210, or other network component) to perform admission/congestion control operations for V2X communications among UE peer devices on a NR sidelink channel.

At 610, the process flow 600 includes enabling a V2X communication with a sidelink channel of the NR sidelink channel based on an admission control scheme or a congestion control scheme.

At 620, a configured mapping is determined based on one or more criteria. At 630, an indication is generated as to whether one or more packets are authorized to be transmitted based on the configured mapping. The configured mapping can be determined as a configured mapping table based on the one or more criteria comprising at least one of: a per packet basis, or a per V2X service basis, and at least one of a priority level of a QoS factor of the one or more packets, or a priority level of a V2X service.

In one embodiment, the process flow 600 can further comprise configuring a first configured mapping table comprising a mapping of V2X services to sidelink frequencies. A second configured mapping table can be configured comprising a second mapping of V2X services to a channel busy ration of the sidelink channel. An indication of whether to utilize the first configured mapping table, the second configured mapping table, or both the first configured mapping table and the second configured mapping table can be provided for determining whether the one or more packets are authorized to transmit via an Access Stratum (AS) layer.

Figure 7:
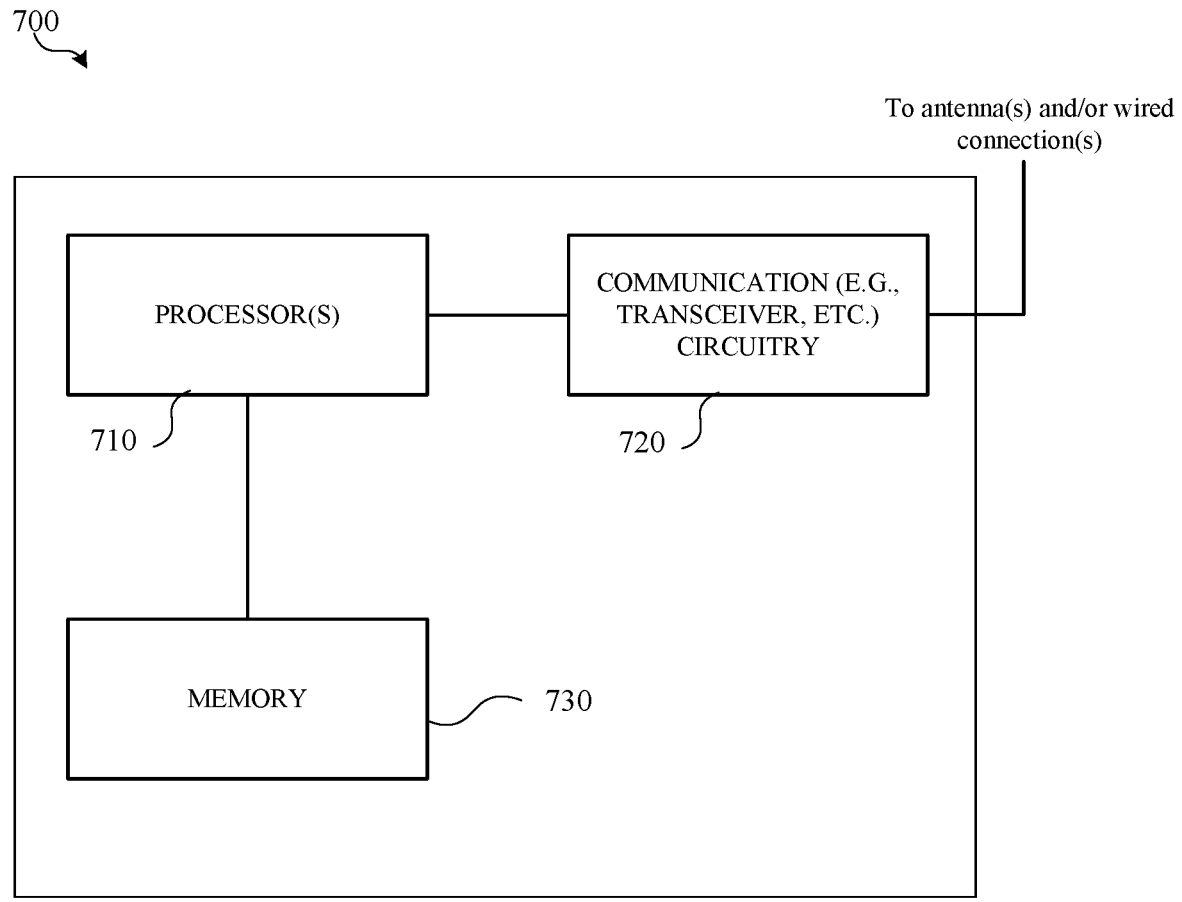
FIG. 7 illustrates a simplified block diagram of an exemplary user equipment wireless communication device or other network device/component in accordance with various aspects described.

Referring to FIG. 7, illustrated is a block diagram of a user equipment wireless communication device (UE) or other network device/component (e.g., UE1, UE2, UE3, UE4 or other participating entity) configured to perform direct peer-to-peer communications, according to various aspects described herein. The UE device 700 includes one or more processors 710 (e.g., one or more baseband processors) comprising processing circuitry and associated interface(s), transceiver circuitry 720 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 730 (which can comprise any of a variety of storage mediums and can store instructions and/or data associated with one or more of processor(s) 710 or transceiver circuitry 720).

In various embodiments (aspects) discussed herein, signals and/or messages can be generated and output for transmission, and/or transmitted messages can be received and processed. Depending on the type of signal or message generated, outputting for transmission (e.g., by processor(s) 710, processor(s) 710, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (OPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 710) can comprise one or more of: identifying physical resources associated with the signal/message, detecting the signal/message, resource element group de-interleaving, demodulation, descrambling, and/or decoding.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In a first set of examples, example 1 includes an admission control method comprising: determining or causing to determine whether a packet is permitted to be transmitted over a sidelink (SL) based on a configured mapping table; and transmitting or causing to transmit the packet over the SL when the packet is permitted to be transmitted over the SL.

Example 2 includes the method of example 1 and/or some other examples herein, wherein the mapping table includes a mapping of services to carrier frequencies, and indicates services authorized and/or unauthorized for SL transmissions, and the method comprises: identifying or causing to identify a trigger to initiate a service; determining or causing to determine that the packet is permitted to be transmitted over the SL when the service is authorized for SL transmission according to the mapping table; and transmitting or causing to transmit the packet over a carrier frequency corresponding to the service in the mapping table when the packet is permitted to be transmitted over the SL.

Example 3 includes the method of example 2 and/or some other examples herein, further comprising: determining or causing to determine that the service is authorized for SL transmission based on an service type associated with the packet.

Example 4 includes the method of example 1 and/or some other examples herein, further comprising: determining or causing to determine whether the packet is authorized to be transmitted over an SL frequency regardless of an initiated service.

Example 5 includes the method of example 4 and/or some other examples herein, wherein when the packet is permitted to be transmitted over the SL, the method comprises: performing or causing to perform SL measurements for channel conditions of an SL channel at the SL frequency.

Example 6 includes the method of examples 4-5 and/or some other examples herein, wherein determining that the packet is permitted to be transmitted over the SL comprises: determining or causing to determine that the packet is permitted to be transmitted over the SL based on QoS information and a current channel load status.

Example 7 includes the method of examples 4-5 and/or some other examples herein, wherein determining that the packet is permitted to be transmitted over the SL comprises: determining or causing to determine that the packet is permitted to be transmitted over the SL based on QoS information regardless of a current channel load status.

Example 8 includes the method of example 7 and/or some other examples herein, wherein determining that the packet is permitted to be transmitted over the SL comprises: determining or causing to determine that the packet is permitted to be transmitted over the SL when the packet has a QoS worse than a QoS requirement indicated by the QoS information; and determining or causing to determine that the packet is not permitted to be transmitted over the SL when the packet has QoS at or better than the QoS requirement indicated by the QoS information.

Example 9 includes the method of examples 7-8 and/or some other examples herein, wherein the QoS information indicates a PC5 Quality Indicator (PQI) and zero or more of a delay tolerance and reliability threshold.

Example 10 includes the method of example 9 and/or some other examples herein, wherein the QoS information indicates one or more PQI values that are allowed or disallowed from transmission.

Example 11 includes the method of examples 7-10 and/or some other examples herein, wherein the QoS information is indicated in received system information broadcasted for a transmission (Tx) pool or indicated in a Radio Resource Control (RRC) configuration of a received RRC message.

Example 12 includes the method of example 6 and/or some other examples herein, further comprising: determining or causing to determine the channel load status for the SL channel based on a Chanel Busy Ratio (CBR) value.

Example 13 includes the method of example 6, 12, and/or some other examples herein, wherein the mapping table includes a mapping of CBR to QoS criteria (or PQI) to Tx parameters, and the further comprises: determining or causing to determine, one or more Tx parameters to apply for the packet corresponding to the CBR and/or PQI in the mapping table.

Example 14 includes the method of example 13 and/or some other examples herein, wherein the Tx parameters include one or more of MCS indexes, Tx powers, and a number of potential retransmissions.

Example 15 includes the method of examples 13-14 and/or some other examples herein, wherein the mapping table includes unused or reserved values indicating that the packet cannot be transmitted over the SL regardless of a PQI associated with the packet.

Example 16 includes the method of example 1 and/or some other examples herein, wherein the mapping table includes a mapping of services to carrier frequencies to CBR, and indicates services authorized and/or unauthorized for SL transmissions, and the method comprises: identifying or causing to identify whether a service has been initiated based on a CBR corresponding to the service in the mapping table; determining or causing to determine that the packet is permitted to be transmitted over the SL when the service has been initiated and when the service is authorized for SL transmission according to the mapping table; applying or causing to apply a per-packet congestion control mechanism to the packet of the service when the service is authorized for SL transmission; and transmitting or causing to transmit the packet over a carrier frequency corresponding to the service in the mapping table when the packet is permitted to be transmitted over the SL.

Example 17 includes the method of example 17 and/or some other examples herein, wherein the mapping of services to carrier frequencies to CBR comprises a first mapping and a second mapping, the first mapping being a mapping of services to carrier frequencies and the second mapping being a mapping of services to CBR, and wherein the first mapping and the second mapping are configured jointly or separately.

Example 18 includes the method of examples 1-17 and/or some other examples herein, further comprising: determining or causing to determine the mapping table, or parameters for generating the mapping table based on information included in a received RRC message or information included in a broadcasted system information message.

Example 19 includes the method of examples 1-17 and/or some other examples herein, further comprising: determining or causing to determine the mapping table, or parameters for generating the mapping table, based on information hard-coded in memory circuitry.

Example 20 includes the method of examples 1-19 and/or some other examples herein, wherein the method is to be performed by baseband circuitry implemented by a user equipment (UE).

Example 21 includes a method for admission and congestion control over NR sidelink for V2X communication.

Example 22 includes the method of example 21 and/or some other examples herein, wherein multiple methods of accomplishing admission and congestion control are defined.

Example 23 includes the method of example 22 and/or some other examples herein, wherein the multiple methods of accomplishing admission and congestion control include a per V2X service wherein the NW provides authorization information to the vehicular UE in the form of a mapping between V2X services and carrier frequencies, based on which the UE can determine whether or not it is allowed to perform transmission for a given V2X service.

Example 24 includes the method of examples 22-23 and/or some other examples herein, wherein the multiple methods of accomplishing admission and congestion control include a per V2X packet wherein the UE is configured with a channel busy ratio to QoS to TX parameter configuration table, which it can use to determine whether a V2X packet can be transmitted.

Example 25 includes the method of example 24 and/or some other examples herein, where the NW only indicates the QoS information in the form of specific VQI/PQI values such that the UE is not allowed to transmit packets with these values, regardless of channel status.

Example 26 includes the method of example 25 and/or some other examples herein, where the NW indicates this QoS information using system information in a cell-specific manner or via dedicated RRC signaling in a UE-specific manner.

Example 27 includes the method of example 24 and/or some other examples herein, where the NW includes mapping table from CBR to PQI values and TX parameter configuration to take channel load into account when allowing the transmission of a given V2X packet.

Example 28 includes the method of examples 22-24 and/or some other examples herein, wherein a combination of per packet and per service can be defined, wherein the network configures channel load criteria mapping to specific V2X services such that the UE firstly checks whether packets from a given service can be admitted into the system, and if allowed by this configuration, the per packet criteria is further applied to control the transmission over sidelink.

Example 29 includes the method of examples 21-28 and/or some other examples herein, wherein the method is to be performed by baseband circuitry implemented by a user equipment (UE).

Example 30 includes a method to be performed by a Radio Access Network (RAN) node, the method comprising: determining or causing to determine a mapping table for sidelink admission control according to any of examples 1-29; generating or causing to generate a message to indicate the mapping table or parameters for generating the mapping table; and transmitting or causing to transmit the message to a user equipment (UE).

Example 31 may include an apparatus comprising means to perform one or more elements of a method described in or related to any of examples 1-30, or any other method or process described herein.

Example 32 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 33 may include an apparatus comprising logic, modules, or circuitry to perform one or more elements of a method described in or related to any of examples 1-30, or any other method or process described herein.

Example 34 may include a method, technique, or process as described in or related to any of examples 1-30, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of examples 1-30, or portions thereof.

Example 36 may include a signal as described in or related to any of examples 1-30, or portions or parts thereof.

Example 37 may include a datagram, packet, frame, segment, protocol data unit (PDU), or message as described in or related to any of examples 1-30, or portions or parts thereof, or otherwise described in the present disclosure.

Example 38 may include a signal encoded with data as described in or related to any of examples 1-30, or portions or parts thereof, or otherwise described in the present disclosure.

Example 39 may include a signal encoded with a datagram, packet, frame, segment, protocol data unit (PDU), or message as described in or related to any of examples 1-30, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of examples 1-30, or portions thereof.

Example 41 may include a computer program comprising instructions, wherein execution of the program by a processing element is to cause the processing element to carry out the method, techniques, or process as described in or related to any of examples 1-30, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Example 50 is an apparatus employed in a user equipment (UE), comprising: processing circuitry configured to: enable a vehicle-to-everything (V2X) communication with a sidelink channel of a new radio (NR) sidelink based on an admission control scheme or a congestion control scheme; perform the admission control scheme or the congestion control scheme comprising: determining a configured mapping; and determining whether a packet is authorized to be transmitted over the sidelink channel based on the configured mapping.

Example 51 includes the subject matter of example 50, wherein the configured mapping is based on at least one of: a V2X service, a packet of the V2X communication, a sidelink frequency, a PC5 Quality Indicator (PQI), one or more Quality of Service (QoS) criteria, a transmit parameter, a channel load status, or a priority level of the V2X service.

Example 52 includes the subject matter of any one of examples 50-51, wherein the processing circuitry is further configured to determine whether the packet is authorized to be transmitted over the sidelink channel via an Access Stratum (AS) layer based on a priority of a V2X service of the V2X communication.

Example 53 includes the subject matter of any one of examples 50-52, wherein the V2X service comprises at least one of: a platooning operation, an autonomous driving, a sensor sharing, or an intelligent transportation service (ITS).

Example 54 includes the subject matter of any one of examples 50-53, wherein the processing circuitry is further configured to generate a comparison of the packet to be transmitted with the configured mapping to determine whether the packet is authorized to be transmitted over the sidelink channel on a sidelink frequency based on a PC5 Quality Indicator (POI), or one or more Quality of Service (QoS) criteria.

Example 55 includes the subject matter of any one of examples 50-54, wherein the processing circuitry is further configured to determine whether the packet to be transmitted is authorized over an AS layer based on a V2X service mapped to an associated sidelink frequency of the configured mapping.

Example 56 includes the subject matter of any one of examples 50-55, wherein the processing circuitry is further configured to receive the configured mapping via a radio resource control (RRC) signaling or a broadcast system information.

Example 57 includes the subject matter of any one of examples 50-56, wherein the processing circuitry is further configured to: perform a sidelink measurement of one or more channel conditions of the sidelink channel; determine a channel load status or a channel busy ratio (CBR) based on the sidelink measurement; and determine whether the packet is authorized to be transmitted over the sidelink channel based on one or more QoS criteria and the channel load status or the CBR of the configured mapping.

Example 58 includes the subject matter of any one of examples 50-57, wherein the configured mapping comprises one or more CBRs, one or more PQIs, and one or more transmit parameters mapped, and the processing circuitry is further configured to determine whether the packet is authorized to be transmitted over the sidelink channel based on a comparison of a V2X QoS Indication (VQI) of the packet with the configured mapping.

Example 59 includes the subject matter of any one of examples 50-58, wherein the processing circuitry is further configured to: determine a priority of the packet based on a V2X service or a QoS flow ID (QFI) belonging to the V2X service; and based on a V2X service-to-sidelink frequency mapping, a V2X service-to-CBR mapping, or both the V2X service-to-sidelink frequency mapping and the V2X service-to-CBR mapping, determine an authorization of the packet to be transmitted via an AS layer for transmission of the V2X communication as a peer-to-peer communication to another vehicle UE (vUE) device.

Example 60 is a tangible computer readable storage device storing executable instructions that, in response to execution, cause one or more processors of a vehicle user equipment (vUE) to perform operations, the operations comprising: performing an admission control scheme, via processing circuitry, comprising: determining a configured mapping; generating a determination of whether a PC5 packet of a V2X communication is authorized to be transmitted over a sidelink channel based on the configured mapping and one or more criteria; and communicating the PC5 packet over the sidelink channel of a new radio (NR) sidelink based on the determination.

Example 61 includes the subject matter of example 60, the operations further comprising at least one of: determining whether the PC5 packet is authorized to be transmitted based on a V2X service of the V2X communication and a sidelink frequency corresponding to the configured mapping; or determining whether the PC5 packet is authorized to be transmitted based on a QoS factor associated with the PC5 packet and one or more dynamic channel conditions over the sidelink channel mapped to one or more transmit parameters.

Example 62 includes the subject matter of any one of examples 60-61, wherein the one or more dynamic channel conditions comprise a channel load status or a channel busy ratio (CBR), wherein the QoS factor comprises a QoS criteria including at least one of: a PC5 Quality Indicator (POI) value, a priority of the V2X service, a priority of the PC5 packet, or a V2X QoS indication (VQI), wherein the V2X service comprises at least one of: a platooning operation, an autonomous driving, a sensor sharing, or an intelligent transportation service (ITS), and wherein the transmit parameters comprises at least one of: a modulation and coding scheme (MCS) index, a transmit power, or a number of potential retransmissions.

Example 63 includes the subject matter of any one of examples 60-62, the operations further comprising: processing a first configured mapping and a second configured mapping jointly or independent as the configured mapping, wherein the first configured mapping comprises a V2X service of the V2X communication mapped to a sidelink frequency, and the second configured mapping comprises one or more V2X services mapped to a channel load status.

Example 64 includes the subject matter of any one of examples 60-63, wherein the one or more criteria comprise at least one of: one or more dynamic channel conditions over the sidelink channel, a PC5 Quality Indication (PQI), one or more Quality of Service (QoS) factors, or one or more transmit parameters.

Example 65 includes the subject matter of any one of examples 60-64, the operations further comprising: determine one or more transmit parameters to apply to the PC5 packet based on at least one of: a CBR, a PQI, or a VQI of the PC5 packet mapped by the configured mapping.

Example 66 includes the subject matter of any one of examples 60-65, the operations further comprising: identifying a point of the configured mapping that is reserved for no transmission as unused or reserved values over the sidelink channel.

Example 67 tangible computer readable storage device storing executable instructions that, in response to execution, cause one or more processors of a vehicle user equipment (vUE) or a next generation NodeB (gNB) to perform operations, the operations comprising: enabling a vehicle-to-everything (V2X) communication with a sidelink channel of a new radio (NR) sidelink based on an admission control scheme or a congestion control scheme; determining a configured mapping based on one or more criteria; and indicating whether one or more packets are authorized to be transmitted over the sidelink channel based on the configured mapping.

Example 68 includes the subject matter of example 67, the operations further comprising: determining a configured mapping table of the configured mapping based on the one or more criteria comprising at least one of: a per packet basis, or a per V2X service basis, and at least one of a priority level of a Quality of Service (QoS) factor of the one or more packets, or a priority level of a V2X service.

Example 69 includes the subject matter of any one of example 67-68, the operations further comprising: configuring a first configured mapping table comprising a mapping of V2X services to sidelink frequencies; configuring a second configured mapping table comprising a second mapping of V2X services to a channel busy ration of the sidelink channel; and providing an indication of whether to utilize the first configured mapping table, the second configured mapping table, or both the first configured mapping table and the second configured mapping table for determining whether the one or more packets are authorized to transmit via an Access Stratum (AS) layer.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor configured to, when executing instructions stored in a memory, perform operations comprising:
    enabling a vehicle-to-everything (V2X) communication with a sidelink channel based on an admission control scheme;
    performing the admission control scheme comprising:
        determining a configured mapping of a V2X service associated with a packet to an associated sidelink frequency;
        determining that the packet is authorized to be transmitted over the sidelink channel on the associated sidelink frequency via an Access Stratum (AS) layer based on the configured mapping, a priority of the V2X service, a carrier frequency associated with the packet, and at least one of: a PC5 Quality Indicator (PQI) or one or more Quality of Service (QoS) criteria;
        wherein the V2X service comprises at least one of: a platooning operation, an autonomous driving, a sensor sharing, or an intelligent transportation service (ITS); and
        providing the packet to an interface with radio frequency circuitry for transmission in response to the determining that the packet is authorized to be transmitted over the sidelink channel.

2. The baseband processor of claim 1, wherein the configured mapping includes a configured mapping between one or more V2X services and one or more carrier frequencies.

3. The baseband processor of claim 1, wherein the operations further comprise:
    performing a sidelink measurement of one or more channel conditions of the sidelink channel;
    determining a channel load status or a channel busy ratio (CBR) based on the sidelink measurement; and
    determining whether the packet is authorized to be transmitted over the sidelink channel based on one or more QoS criteria and the channel load status or the CBR of the configured mapping.

4. The baseband processor of claim 3, wherein the configured mapping comprises one or more CBRs, one or more PQIs, and one or more transmit parameters mapped, and the operations further comprise determining whether the packet is authorized to be transmitted over the sidelink channel based on a comparison of a V2X QoS Indication (VQI) of the packet with the configured mapping.

5. The apparatus baseband processor of claim 4, wherein the operations further comprise:
determining a priority of the packet based on a V2X service or a QoS flow ID (QFI) belonging to the V2X service; and
based on a V2X service-to-sidelink frequency mapping, a V2X service-to-CBR mapping, or both the V2X service-to-sidelink frequency mapping and the V2X service-to-CBR mapping, determining an authorization of the packet to be transmitted via an AS layer for transmission of the V2X communication as a peer-to-peer communication to vehicle user equipment (vUE) device.

6. The baseband processor of claim 1, wherein the configured mapping is determined based on one or more of: radio resource control (RRC) signaling, broadcast system information, or information hard-coded in memory circuitry coupled to the baseband processor.

7. A user equipment (UE), comprising:
radio frequency (RF) circuitry; and
one or more processors configured to execute instructions stored in a memory to cause the UE to:
perform an admission control scheme comprising:
determining a configured mapping between one or more vehicle-to-everything (V2X) services and one or more carrier frequencies;
generating a determination of whether a PC5 packet of a V2X communication is authorized to be transmitted over a sidelink channel based on a Quality of Service (QoS) factor associated with the PC5 packet, one or more dynamic channel conditions over the sidelink channel mapped to one or more transmit parameters, the configured mapping, and one or more criteria;
wherein the one or more criteria includes a V2X service associated with the PC5 packet and a carrier frequency associated with the PC5 packet;
wherein the one or more dynamic channel conditions comprise a channel load status or a channel busy ratio (CBR);
wherein the QoS factor comprises a QoS criteria including at least one of:
a PC5 Quality Indicator (PQI) value, a priority of the V2X service, a priority of the PC5 packet, or a V2X QoS indication (VQI), wherein the V2X service comprises at least one of: a platooning operation, an autonomous driving, a sensor sharing, or an intelligent transportation service (ITS), and wherein the transmit parameters comprises at least one of: a modulation and coding scheme (MCS) index, a transmit power, or a number of potential retransmissions; and
communicating, via the RF circuitry, the PC5 packet over the sidelink channel of a new radio (NR) sidelink based on the determination.

8. The UE of claim 7, wherein the one or more processors further cause the UE to:
determine whether the PC5 packet is authorized to be transmitted based on a V2X service of the V2X communication and a sidelink frequency corresponding to the configured mapping.

9. The UE of claim 8, wherein the one or more processors further cause the UE to:
process a first configured mapping and a second configured mapping jointly or independent as the configured mapping, wherein the first configured mapping comprises a V2X service of the V2X communication mapped to a sidelink frequency, and the second configured mapping comprises one or more V2X services mapped to a channel load status.

10. The UE of claim 8, wherein the one or more criteria comprise at least one of: one or more dynamic channel conditions over the sidelink channel, a PQI, one or more QoS factors, or one or more transmit parameters.

11. The UE of claim 10, wherein the one or more processors further cause the UE to:
determine one or more transmit parameters to apply to the PC5 packet based on at least one of: a CBR, a PQI, or a VQI of the PC5 packet mapped by the configured mapping.

12. The UE of claim 11, wherein the one or more processors further cause the UE to:
identify a point of the configured mapping that is reserved for no transmission as unused or reserved values over the sidelink channel.

13. The UE of claim 7, wherein the configured mapping is determined based on one or more of: radio resource control (RRC) signaling, broadcast system information, or information hard-coded in memory circuitry of the UE.

14. A tangible computer readable storage device storing executable instructions that, in response to execution, cause one or more processors of a vehicle user equipment (vUE) or a next generation NodeB (gNB) to perform operations, the operations comprising:
enabling a vehicle-to-everything (V2X) communication with a sidelink channel of a new radio (NR) sidelink based on an admission control scheme or a congestion control scheme;
determining a configured mapping based on one or more criteria;
determining a configured mapping table of the configured mapping based on the one or more criteria comprising at least one of: a per packet basis, or a per V2X service basis, and at least one of a priority level of a Quality of Service (QoS) factor of one or more packets, or a priority level of a V2X service;
configuring a first configured mapping table comprising a mapping of V2X services to sidelink frequencies;
configuring a second configured mapping table comprising a second mapping of V2X services to a channel busy ratio of the sidelink channel; and
providing an indication of whether to utilize the first configured mapping table, the second configured mapping table, or both the first configured mapping table and the second configured mapping table for determining whether the one or more packets are authorized to transmit via an Access Stratum (AS) layer; and
indicating whether one or more packets are authorized to be transmitted over the sidelink channel based on the configured mapping.

* * * * *